United States Patent
Kutz et al.

(10) Patent No.: US 12,213,137 B2
(45) Date of Patent: Jan. 28, 2025

(54) SLOT STRUCTURE FOR AUTOMATIC GAIN CONTROL FOR HIGH SUBCARRIER SPACING

(71) Applicant: QUALCOMM Incorporated, San Diego, CA (US)

(72) Inventors: Gideon Shlomo Kutz, Ramat Hasharon (IL); Tal Oved, Modiin (IL); Elad Meir, Ramat Gan (IL); Moshe Ben-Ari, Rehovot (IL); Shay Landis, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 237 days.

(21) Appl. No.: 17/673,637

(22) Filed: Feb. 16, 2022

(65) Prior Publication Data

US 2023/0262702 A1    Aug. 17, 2023

(51) Int. Cl.
*H04W 72/25* (2023.01)
*H04W 52/52* (2009.01)
*H04W 72/0446* (2023.01)
*H04W 72/20* (2023.01)

(52) U.S. Cl.
CPC .......... *H04W 72/20* (2023.01); *H04W 52/52* (2013.01); *H04W 72/0446* (2013.01)

(58) Field of Classification Search
CPC .............................. H04W 72/25; H04W 72/40
See application file for complete search history.

(56) References Cited

U.S. PATENT DOCUMENTS

| | | | |
|---|---|---|---|
| 2021/0028913 A1* | 1/2021 | Peng | .......................... H04L 1/00 |
| 2021/0112505 A1* | 4/2021 | Li | ........................ H04L 27/2607 |
| 2021/0203462 A1* | 7/2021 | Xiang | ................... H04L 5/0044 |
| 2021/0212106 A1 | 7/2021 | Farag et al. | |

(Continued)

OTHER PUBLICATIONS

Dahlman E., et al., "5G NR The Next Generation Wireless Access Technology, 2nd Edition, Chapters 18-27", In: "5G NR", Sep. 18, 2020, Elsevier, XP055908003, ISBN: 978-0-12-822320-8, pp. 1-611, p. 457, line 1-p. 485, last line, 215 Pages, Sections 23.2, 23.3.1, 23.3.2, 23.4.1.3, 26.5.1, 26.5.2; figures 23. 6, 23.7.

(Continued)

*Primary Examiner* — Zhiren Qin
(74) *Attorney, Agent, or Firm* — Holland & Hart/QUALCOMM Incorporated

(57) ABSTRACT

Methods, systems, and devices for wireless communications are described. In some examples, when a high subcarrier spacing (SCS) is used for sidelink communications, the user equipments (UEs) may use a modified sidelink slot structure for the sidelink communications. In one example, the slot structure may include at least two automatic gain control (AGC) symbols with at least one sidelink control channel symbol between the two AGC symbols. The UE may perform an AGC procedure during the two AGC symbols and the sidelink control channel symbol. In some examples, the slot structure may include bundled slots to minimize per slot overhead associated with AGC symbols and sidelink control channel symbols. For example, at a high SCS, the slot structure may include a first slot including multiple AGC symbols, Subsequent bundled slots may not include AGC symbols and/or sidelink control channel symbols.

35 Claims, 16 Drawing Sheets

(56) References Cited

U.S. PATENT DOCUMENTS

| | | | |
|---|---|---|---|
| 2021/0250910 A1* | 8/2021 | Park | H04W 72/02 |
| 2022/0030555 A1* | 1/2022 | Chae | H04W 72/0446 |
| 2022/0159626 A1* | 5/2022 | Yeo | H04L 5/0094 |
| 2022/0201629 A1* | 6/2022 | Ko | H04W 56/00 |
| 2024/0008061 A1* | 1/2024 | Kim | H04B 17/328 |
| 2024/0147455 A1* | 5/2024 | Zhao | H04W 72/0446 |
| 2024/0147503 A1* | 5/2024 | Shimezawa | H04W 4/40 |

OTHER PUBLICATIONS

International Search Report and Written Opinion—PCT/US2023/060912—ISA/EPO—May 8, 2023.

* cited by examiner

SLOT STRUCTURE FOR AUTOMATIC GAIN CONTROL FOR HIGH SUBCARRIER SPACING

INTRODUCTION

The following relates generally to wireless communications, and more specifically to slot structures with multiple automatic gain control symbols.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (IE).

SUMMARY

A method for wireless communications at a first UE is described. The method may include receiving an indication of a subcarrier spacing to be used for sidelink communications between the first UE and one or more second UEs. In some examples, the method may include receiving the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol. In some examples, the method may include performing an automatic gain control procedure for the sidelink communications during an automatic gain control period that includes at least the first automatic gain control symbol and the second automatic gain control symbol.

An apparatus for wireless communications at a first UE is described. The apparatus may include a processor, and memory coupled with the processor. The processor may be configured to receive an indication of a subcarrier spacing to be used for sidelink communications between the first UE and one or more second UEs. In some examples, the processor may be configured to receive the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol In some examples, the processor may be configured to perform an automatic gain control procedure for the sidelink communications during an automatic gain control period that includes at least the first automatic gain control symbol and the second automatic gain control symbol.

Another apparatus for wireless communications at a first UE is described. The apparatus may include means for receiving an indication of a subcarrier spacing to be used for sidelink communications between the first UE and one or more second UEs. In some examples, the apparatus may include means for receiving the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol. In some examples, the processor may include means for performing an automatic gain control procedure for the sidelink communications during an automatic gain control period that includes at least the first automatic gain control symbol and the second automatic gain control symbol.

A non-transitory computer-readable medium storing code for wireless communications at a first UE is described. The code may include instructions executable by a processor to receive an indication of a subcarrier spacing to be used for sidelink communications between the first UE and one or more second UEs. In some examples, the code may include instructions executable by the processor to receive the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol. In some examples, the code may include instructions executable by the processor to perform an automatic gain control procedure for the sidelink communications during an automatic gain control period that includes at least the first automatic gain control symbol and the second automatic gain control symbol.

Some examples of the method, apparatuses, and non-transitory computer-readable medium described herein may further include operations, features, means, or instructions for applying, based on the automatic gain control procedure, an automatic gain control to the sidelink communications that occur over a set of multiple slots.

Some examples of the method, apparatuses, and non-transitory computer-readable medium described herein may further include operations, features, means, or instructions for receiving a first instance of a first signal during a temporally first symbol of the slot structure and receiving a second instance of the first signal during a temporally second symbol of the slot structure, where the temporally first symbol of the slot structure may be the first automatic gain control symbol, and where the temporally second symbol of the slot structure may be the sidelink control channel symbol.

Some examples of the method, apparatuses, and non-transitory computer-readable medium described herein may further include operations, features, means, or instructions for receiving a first instance of a second signal during a temporally third symbol of the slot structure and receiving a second instance of the second signal during a temporally fourth symbol of the slot structure, where the temporally third symbol of the slot structure may be the second automatic gain control symbol.

Some examples of the method, apparatuses, and non-transitory computer-readable medium described herein may further include operations, features, means, or instructions for receiving a first instance of a first signal during the first automatic gain control symbol, receiving a second instance of the first signal during; the slot structure, receiving a first instance of a second signal during the second automatic gain control symbol, and receiving a second instance of the second signal during the slot structure.

Some examples of the method, apparatuses, and non-transitory computer-readable medium described herein may further include operations, features, means, or instructions for receiving a first signal during the first automatic gain control symbol and receiving a second signal during the second automatic gain control symbol, where the first automatic gain control symbol and the second automatic gain control symbol may be both of a same receive power as other signals received during other symbols of the slot structure.

Some examples of the method, apparatuses, and non-transitory computer-readable medium described herein may further include operations, features, means, or instructions for receiving, in the sidelink control channel symbol, a sidelink control channel signal spanning a resource allocation of a sidelink shared channel associated with the sidelink control channel signal, the sidelink control channel symbol being a temporally second symbol of the slot structure.

Some examples of the method, apparatuses, and non-transitory computer-readable medium described herein may further include operations, features, means, or instructions for receiving, in a temporally fourth symbol of the slot structure and following the second automatic gain control symbol, a second portion of the sidelink control channel signal spanning a portion of the resource allocation.

Some examples of the method, apparatuses, and non-transitory computer-readable medium described herein may further include operations, features, means, or instructions for demodulating the sidelink control channel signal received in the temporally second symbol and the second portion of the sidelink control channel signal received in the temporally fourth symbol separately.

Some examples of the method, apparatuses, and non-transitory computer-readable medium described herein may further include operations, features, means, or instructions for measuring, at a first level of granularity, a first received signal strength during the first automatic gain control symbol, tuning a low noise amplifier of the first UE during the first automatic gain control symbol and based on the first received signal strength, measuring, at a second level of granularity that may be more refined than the first level of granularity, a second received signal strength during the sidelink control channel symbol, and tuning the low noise amplifier of the first UE during the second automatic gain control symbol and based on the second received signal strength.

Some examples of the method, apparatuses, and non-transitory computer-readable medium described herein may further include operations, features, means, or instructions for selecting the slot structure from a set of multiple available slot structures based on the subcarrier spacing being above a subcarrier spacing threshold.

In some examples of the method, apparatuses, and non-transitory computer-readable medium described herein, the subcarrier spacing threshold may be 30 kilohertz.

A method for wireless communications at a first UE is described. The method may include receiving an indication of a subcarrier spacing to be used for sidelink communications between the first UE and one or more second UEs. In some examples, the method may include receiving the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots. In some examples, the method may include performing an automatic gain control procedure for the sidelink communications during an automatic gain control period that includes the set of multiple automatic gain control symbols.

An apparatus for wireless communications at a first UE is described. The apparatus may include a processor, and memory coupled with the processor. The processor may be configured to receive an indication of a subcarrier spacing to be used for sidelink communications between the first UE and one or more second UEs. In some examples, the processor may be configured to receive the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots. In some examples, the processor may be configured to perform an automatic gain control procedure for the sidelink communications during an automatic gain control period that includes the set of multiple automatic gain control symbols.

Another apparatus for wireless communications at a first UE is described. The apparatus may include means for receiving an indication of a subcarrier spacing to be used for sidelink communications between the first UE and one or more second UEs. In some examples, the apparatus may include means for receiving the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots. In some examples, the apparatus may include means for performing an automatic gain control procedure for the sidelink communications during an automatic gain control period that includes the set of multiple automatic gain control symbols.

A non-transitory computer-readable medium storing code for wireless communications at a first UE is described. The code may include instructions executable by a processor to receive an indication of a subcarrier spacing to be used for sidelink communications between the first UE and one or more second UEs. In some examples, the code may include instructions executable by the processor to receive the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots. In some examples, the code may include instructions executable by the processor to perform an automatic gain control procedure for the sidelink communications during an automatic gain control period that includes the set of multiple automatic gain control symbols.

In some examples of the method, apparatuses, and non-transitory computer-readable medium described herein, the slot structure further includes a sidelink control channel symbol within the first slot of the set of multiple slots, the sidelink control channel symbol pertaining to the set of multiple slots.

Some examples of the method, apparatuses, and non-transitory computer-readable medium described herein may further include operations, features, means, or instructions for receiving a sidelink control channel message during the sidelink control channel symbol which may be between instances of the automatic gain control symbols of the set of multiple automatic gain control symbols in the first slot.

Some examples of the method, apparatuses, and non-transitory computer-readable medium described herein may further include operations, features, means, or instructions for receiving a sidelink control channel message during the sidelink control channel symbol which may be after the set of multiple automatic gain control symbols in the first slot.

Some examples of the method, apparatuses, and non-transitory computer-readable medium described herein may further include operations, features, means, or instructions for receiving the sidelink communications, at least in part, during a second slot of the set of multiple slots, the second slot including a set of multiple symbols, each symbol of the set of multiple symbols including a data symbol.

Some examples of the method, apparatuses, and non-transitory computer-readable medium described herein may further include operations, features, means, or instructions for receiving a first signal during a first automatic gain control symbol of the set of multiple automatic gain control symbols and receiving a second signal during a second automatic gain control symbol of the set of multiple automatic gain control symbols, where the first automatic gain control symbol and the second automatic gain control symbol may be both of a same receive power as other signals received during other symbols of the slot structure.

Some examples of the method, apparatuses, and non-transitory computer-readable medium described herein may further include operations, features, means, or instructions for applying a result of the automatic gain control procedure to the set of multiple slots, where a number of slots of the set of multiple slots may be based on a resource pool associated with the sidelink communications.

Some examples of the method, apparatuses, and non-transitory computer-readable medium described herein may further include operations, features, means, or instructions for receiving the sidelink communications, at least in part, during a temporally last slot of the set of multiple slots, where the temporally last slot includes a guard symbol as a temporally last symbol of the temporally last slot, a respective temporally last symbol of other slots of the set of multiple slots including a data symbol.

Some examples of the method, apparatuses, and non-transitory computer-readable medium described herein may further include operations, features, means, or instructions for measuring, at a first level of granularity, a first received signal strength during a first automatic gain control symbol of the set of multiple automatic gain control symbols, tuning a low noise amplifier of the first UE during the first automatic gain control symbol and based on the first received signal strength, measuring, at a second level of granularity that may be more refined than the first level of granularity, a second received signal strength during a second automatic gain control symbol of the set of multiple automatic gain control symbols, and tuning the low noise amplifier of the first UE during a third automatic gain control symbol of the set of multiple automatic gain control symbols and based on the second received signal strength.

Some examples of the method, apparatuses, and non-transitory computer-readable medium described herein may further include operations, features, means, or instructions for selecting the slot structure from a set of multiple available slot structures based on the subcarrier spacing being above a subcarrier spacing threshold.

In some examples of the method, apparatuses, and non-transitory computer-readable medium described herein, the subcarrier spacing threshold includes 30 kilohertz.

A method for wireless communications at a second UE is described. The method may include transmitting, to a first UE, an indication of a subcarrier spacing to be used for sidelink communications between the first UE and the second UE. In some examples, the method may include transmitting, to the first UE, the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol.

An apparatus for wireless communications at a second UE is described. The apparatus may include a processor, and memory coupled with the processor. The processor may be configured to transmit, to a first UE, an indication of a subcarrier spacing to be used for sidelink communications between the first UE and the second IE. In some examples, the processor may be configured to transmit, to the first IE, the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol.

Another apparatus for wireless communications at a second UE is described. The apparatus may include means for transmitting, to a first UE, an indication of a subcarrier spacing to be used for sidelink communications between the first UE and the second UE. In some examples, the apparatus may include means for transmitting, to the first UE, the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol.

A non-transitory computer-readable medium storing code for wireless communications at a second UE is described. The code may include instructions executable by a processor to transmit, to a first UE, an indication of a subcarrier spacing to be used for sidelink communications between the first UE and the second IE. In some examples, the code may include instructions executable by the processor to transmit, to the first UE, the sidelink communications in accordance with a slot structure that is based on the subcarrier spacing, the slot structure including a first automatic gain control symbol, a second automatic gain control symbol, and a sidelink control channel symbol between the first automatic gain control symbol and the second automatic gain control symbol.

Some examples of the method, apparatuses, and non-transitory computer-readable medium described herein may further include operations, features, means, or instructions for transmitting a first instance of a first signal during a temporally first symbol of the slot structure and transmitting a second instance of the first signal during a temporally second symbol of the slot structure, where the temporally first symbol of the slot structure may be the first automatic gain control symbol, and where the temporally second symbol of the slot structure may be the sidelink control channel symbol.

Some examples of the method, apparatuses, and non-transitory computer-readable medium described herein may further include operations, features, means, or instructions for transmitting a first instance of a second signal during a temporally third Symbol of the slot structure and transmitting a second instance of the second signal during a temporally fourth symbol of the slot structure, where the temporally third symbol of the slot structure may be the second automatic gain control symbol.

Some examples of the method, apparatuses, and non-transitory computer-readable medium described herein may further include operations, features, means, or instructions for transmitting a first instance of a first signal during the first automatic gain control symbol, transmitting a second instance of the first signal during the slot structure, transmitting a first instance of a second signal during the second automatic gain control symbol, and transmitting a second instance of the second signal during the slot structure.

Some examples of the method, apparatuses, and non-transitory computer-readable medium described herein may further include operations, features, means, or instructions for transmitting a first signal during the first automatic gain control symbol and transmitting a second signal during the second automatic gain control symbol, where the first automatic gain control symbol and the second automatic gain control symbol may be both of a same transmit power as other signals received during other symbols of the slot structure.

Some examples of the method, apparatuses, and non-transitory computer-readable medium described herein may further include operations, features, means, or instructions for transmitting, in the sidelink control channel symbol, a sidelink control channel signal spanning a resource allocation of a sidelink shared channel associated with the sidelink control channel signal, the sidelink control channel symbol being a temporally second symbol of the slot structure.

Some examples of the method, apparatuses, and non-transitory computer-readable medium described herein may further include operations, features, means, or instructions for transmitting, in a temporally fourth symbol of the slot structure and following the second automatic gain control symbol, a second portion of the sidelink control channel signal spanning a portion of the resource allocation.

Some examples of the method, apparatuses, and non-transitory computer-readable medium described herein may further include operations, features, means, or instructions for selecting the slot structure from a set of multiple available slot structures based on the subcarrier spacing being above a subcarrier spacing threshold.

In some examples of the method, apparatuses, and non-transitory computer-readable medium described herein, the subcarrier spacing threshold may be 30 kilohertz.

A method for wireless communications at a second UE is described. The method may include transmitting, to a first UE, an indication of a subcarrier spacing to be used for sidelink communications between the first UE and the second UE. In some examples, the method may include transmitting, to the first UE, the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots.

An apparatus for wireless communications at a second UE is described. The apparatus may include a processor, and memory coupled with the processor. The processor may be configured to transmit, to a first UE, an indication of a subcarrier spacing to be used for sidelink communications between the first IE and the second IE. In some examples, the processor may be configured to transmit, to the first UE, the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots.

Another apparatus for wireless communications at a second UE is described. The apparatus may include means for transmitting, to a first UE, an indication of a subcarrier spacing to be used for sidelink communications between the first UE and the second IE. In some examples, the apparatus may include means for transmitting, to the first UE, the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots.

A non-transitory computer-readable medium storing code for wireless communications at a second UE is described. The code may include instructions executable by a processor to transmit, to a first UE, an indication of a subcarrier spacing to be used for sidelink communications between the first UE and the second UE. In some examples, the code may include instructions executable by the processor to transmit, to the first UE, the sidelink communications in accordance with a slot structure that is based on the subcarrier spacing, the slot structure including a set of multiple automatic gain control symbols within a first slot of a set of multiple slots, the set of multiple automatic gain control symbols pertaining to the set of multiple slots.

In some examples of the method, apparatuses, and non-transitory computer-readable medium described herein, the slot structure further includes a sidelink control channel symbol within the first slot of the set of multiple slots, the sidelink control channel symbol pertaining to the set of multiple slots.

Some examples of the method, apparatuses, and non-transitory computer-readable medium described herein may further include operations, features, means, or instructions for transmitting a sidelink control channel message during the sidelink control channel symbol which may be between instances of the automatic gain control symbols of the set of multiple automatic gain control symbols in the first slot.

Some examples of the method, apparatuses, and non-transitory computer-readable medium described herein may further include operations, features, means, or instructions for transmitting a sidelink control channel message during the sidelink control channel symbol which may be after the set of multiple automatic gain control symbols in the first slot.

Some examples of the method, apparatuses, and non-transitory computer-readable medium described herein may further include operations, features, means, or instructions for transmitting the sidelink communications, at least in part, during a second slot of the set of multiple slots, the second slot including a set of multiple symbols, each symbol of the set of multiple symbols including a data symbol.

Some examples of the method, apparatuses, and non-transitory computer-readable medium described herein may further include operations, features, means, or instructions for transmitting a first signal during a first automatic gain control symbol of the set of multiple automatic gain control symbols and transmitting a second signal during a second automatic gain control symbol of the set of multiple automatic gain control symbols, where the first automatic gain control symbol and the second automatic gain control symbol may be both of a same receive power as other signals received during other symbols of the slot structure.

Some examples of the method, apparatuses, and non-transitory computer-readable medium described herein may further include operations, features, means, or instructions for transmitting the sidelink communications, at least in part, during a temporally last slot of the set of multiple slots, where the temporally last slot includes a guard symbol as a temporally last symbol of the temporally last slot, a respective temporally last symbol of other slots of the set of multiple slots including a data symbol.

Some examples of the method, apparatuses, and non-transitory computer-readable medium described herein may further include operations, features, means, or instructions for selecting the slot structure from a set of multiple available slot structures based on the subcarrier spacing being above a subcarrier spacing threshold.

In some examples of the method, apparatuses, and non-transitory computer-readable medium described herein, the subcarrier spacing threshold includes 30 kilohertz.

DETAILED DESCRIPTION

Figure 1:
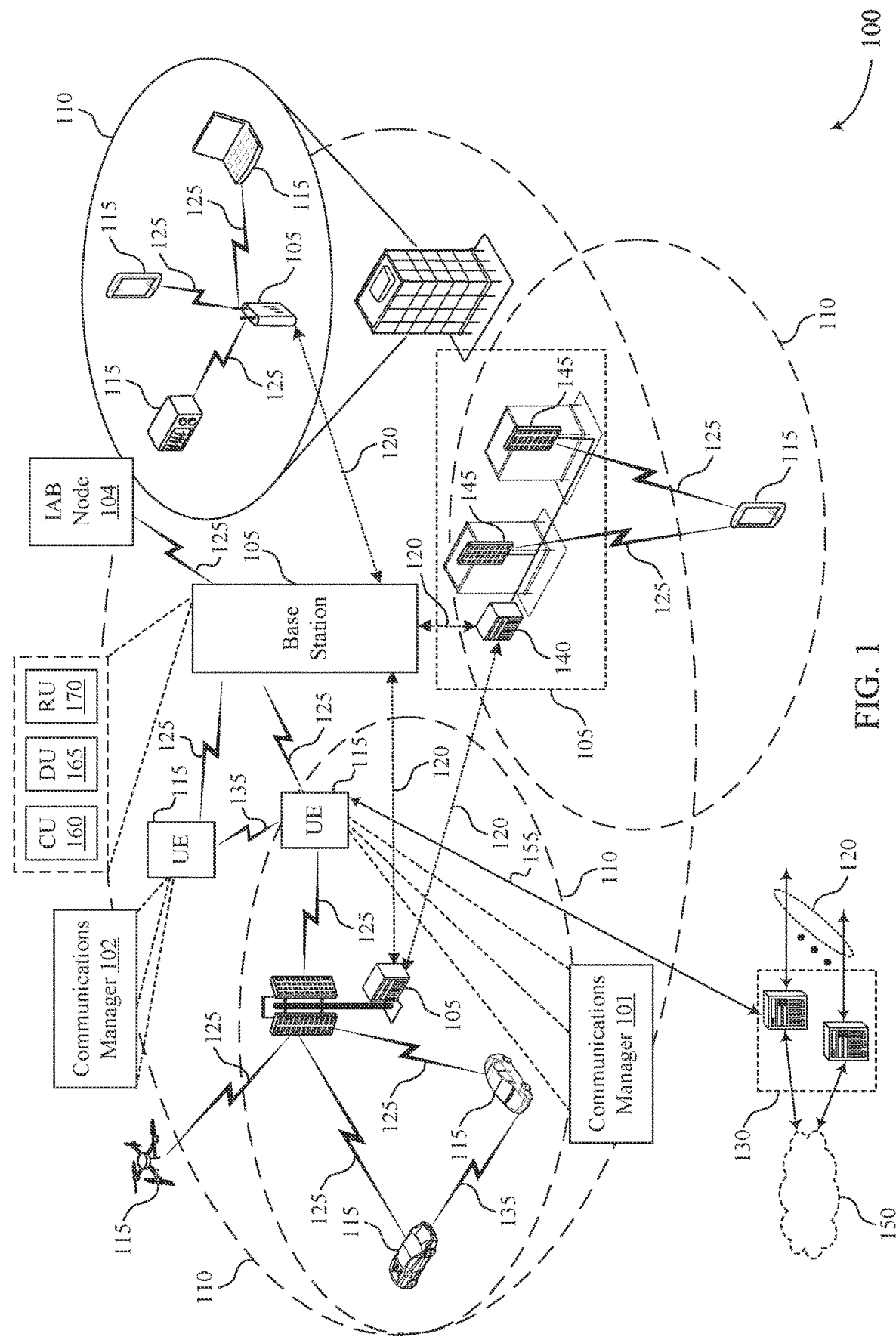
FIG. 1 illustrates an example of a wireless communications system that supports slot structure for automatic gain control for high subcarrier spacing in accordance with one or more aspects of the present disclosure.

A wireless communications system may support sidelink communication. Sidelink communication may be described as communication between two UEs. A slot marked for sidelink may include multiple symbols. A first symbol of the slot may be a duplicate of a symbol included in a physical sidelink shared channel (PSSCH) or a physical sidelink control channel (PSCCH) resource allocation following the first symbol and, in some cases, may be used for automatic gain control (AGC). AGC allows a UE to change the gain of a received signal such that the signal falls within a range of an analog to digital converter (ADC). An AGC process may include determining a first coarse received signal strength indicator (RSSI) measurement, performing a first low noise amplifier (LNA) tuning based on the first coarse RSSI measurement, determining a refined RSSI measurement, and then performing a second LNA tuning based on the refined RSSI measurement. A course RSSI refers to measuring, at a first level of granularity, an RSSI of a signal received during an AGC symbol. A refined RSSI refers to measuring, at a level of granularity that is more refined than the first level of granularity, an RSSI of a signal received during an AGC symbol. Granularity refers to a scale size or measurement step size, And LNA is an amplifier that amplifies a very low-power signal without significantly degrading its signal-to-noise ratio (SNR).

When operating at a 30 kHz subcarrier spacing (SCS), the UE may perform the coarse RSSI measurement, the first LNA tuning, the refined RSSI measurement, and the second tuning within one AGC symbol. In some examples, the UE may operate in a higher frequency range (e.g., FR2-1 or FR2-2) with a higher SCS (e.g., 120 kilohertz (kHz)). Operating at the higher frequency range may result in shorter symbol durations. As such, a UE operating in the higher frequency range may be unable to complete AGC using the single AGC symbol.

In some examples, when a higher than 30 kHz SCS is used for sidelink communications, the UEs may use a modified sidelink slot structure for the sidelink communications. In one example, the slot structure may include at least two AGC symbols with at least one sidelink control channel symbol between the two AGC symbols. The UE may perform the coarse RSSI measurement and the first LNA tuning during the first AGC symbol, the second RSSI measurement during the sidelink control channel symbol, and the second LNA tuning during the second AGC symbol. The UE may receive a physical sidelink control channel (PSCCH) signal during the sidelink control channel symbol and use the first LNA tuning based on the coarse RSSI measurement for that reception as PSCCH may operate at a low SNR.

In some examples, the slot structure may include bundled slots to minimize per slot overhead associated with sidelink control channel symbols and AGC symbols. For example, at a high SCS, the slot structure may include a first slot including multiple AGC symbols. Subsequent bundled slots may not include AGC symbols. In some examples, the first slot may also include one or more sidelink control channel symbols (e.g., for PSCCH signals), and subsequent slots may only include data symbols. The determined AGC training and corresponding LNA tuning may be applied for multiple slots. Accordingly bundling refers to applying AGC for multiple slots. The number of slots that are bundled may depend on a resource allocation associated with the sidelink communications and a capability of the UE to bundle slots.

Aspects of the disclosure are initially described in the context of wireless communications systems. Aspects of the disclosure are further illustrated by and described with reference to timing diagrams, resource diagrams, and process flows. Aspects of the disclosure are further illustrated by and described with reference to apparatus diagrams, system diagrams, and flowcharts that relate to slot structure for automatic gain control for high SCS.

FIG. 1 illustrates an example of a wireless communications system 100 that supports slot structure for automatic gain control for high SCS in accordance with one or more aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having; different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

In some examples, one or more components of the wireless communications system 100 may operate as or be referred to as a network node. As used herein, a network node may refer to any UE 115, base station 105, entity of a core network 130, apparatus, device, or computing system configured to perform any techniques described herein. For example, a network node may be a UE 115. As another example, a network node may be a base station 105. As another example, a first network node may be configured to communicate with a second network node or a third network node. In one aspect of this example, the first network node may be a UE 115, the second network node may be a base station 105, and the third network node may be a UE 115. In another aspect of this example, the first network node may be a UE 115, the second network node may be a base station 105, and the third network node may be a base station 105. In yet other aspects of this example, the first, second, and third network nodes may be different. Similarly, reference to a UE 115, a base station 105, an apparatus, a device, or a computing system may include disclosure of the UE 115, base station 105, apparatus, device, or computing system being a network node. For example, disclosure that a UE 115 is configured to receive information from a base station 105 also discloses that a first network node is configured to receive information from a second network node. In this example, consistent with this disclosure, the first network node may refer to a first UE 115, a first base station 105, a first apparatus, a first device, or a first computing system configured to receive the information; and the second network node may refer to a second UE 115, a second base station 105, a second apparatus, a second device, or a second computing system.

As described herein, a node, which may be referred to as a node, a network node, a network entity, or a wireless node, may be a base station (e.g., any base station described herein), a UE (e.g., any UE described herein), a network controller, an apparatus, a device, a computing system, one or more components, and/or another suitable processing entity configured to perform any of the techniques described herein. For example, a network node may be a UE. As another example, a network node may be a base station. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network node: may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE being configured to receive information from a base station also discloses that a first network node being configured to receive information from a second network node, the first network node may refer to a first UE, a first base station, a first apparatus, a first device, a first computing system, a first one or more components, a first processing entity, or the like configured to receive the information; and the second network node may refer to a second UE, a second base station, a second apparatus, a second device, a second computing system, a first one or more components, a first processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

The base stations 105 may communicate with the core network 130, or with one another, or both. For example, the base stations 105 may interface with the core network 130 through one or more backhaul links 120 (e.g. via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB) a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration, Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and SCS are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include an SCS ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported SCS, and $N_f$ may represent the maximum supported discrete Fourier transform (DFT) size. Time intervals of a communications resource may be organized according to radio frames each having a specified duration (e.g., 10 milliseconds (ins)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on SCS. Each slot may include a number of symbol periods (e.g., depending on the length of the cyclic prefix prepended to each symbol period). In some wireless communications systems 100, a slot may further be divided into multiple mini-slots containing one or more symbols, Excluding the cyclic prefix, each symbol period may contain one or more (e.g., $N_f$) sampling periods. The duration of a symbol period may depend on the SCS or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g. in bursts of shortened TTIs (sITTs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells, Small cells may provide unrestricted access to the UEs 115 with service subscriptions with the network provider or may provide restricted access to the UEs 115 having an association with the small cell (e.g., the UEs 115 in a closed subscriber group (CSC), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105, In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices, Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). The communication link 135 may be or may include a sidelink. One or more UEs 115 utilizing D2D communications may be within the geographic coverage area 110 of a base station 105, Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC) which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the VHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the IEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according; to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by abase station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g. a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The IEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture), In a disaggregated architecture, the RAN may be split into three areas of functionality corresponding to the CU 160, the DU 165, and the RU 170. The split of functionality between the CU 160, DIU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or LAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g. IAB nodes 104)

via supported access and backhaul links. IAB nodes 104 may support mobile terminal (MT) functionality controlled and/or scheduled by DUs 165 of a coupled TAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and ULs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g. RLC MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CU/s 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). JAB nodes 104 may include a DU 165 and an MT. A DU 165 may act as a distributed scheduling node towards child nodes associated with the LAB node 104, and the MT may act as a scheduled node towards parent nodes associated with the IAB node 104. That is, an LAB donor may be referred to as a parent node in communication with one or more child nodes (e.g., an LAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of LAB nodes 104 (e.g., MTs) may provide a Uu interface for a child node to receive signaling from a parent LAB node 104, and the DU interface (e.g., DUs 165) may provide a Uu interface for a parent node to signal to a child LAB node 104 or UE 115.

For example, TAB node 104 may be referred to a parent node associated with IAB node, and a child node associated with IAB donor. The LAB donor may include a CU 160 with a wireline (e.g., optical fiber) or wireless connection to the core network and may act as parent node to IAB nodes 104. For example, the DU 165 of IAB donor may relay transmissions to UEs 115 through LAB nodes 104, and may directly signal transmissions to a UE 115. The CU 160 of LAB donor may signal communication link establishment via an F1 interface to IAB nodes 104, and the TAB nodes 104 may schedule transmissions (e.g., transmissions to the UEs 115 relayed from the IAB donor) through the DJs 165. That is, data may be relayed to and from LAB nodes 104 via signaling over an NR Uu interface to MT of the IAB node 104. Communications with TAB node 104 may be scheduled by DU 165 of LAB donor and communications with LAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of LAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g. IAB nodes, DUs, CUs, etc.).

A wireless communications system may support sidelink communication. Sidelink communication may be described as communication between two UEs. For example, a first UE 115 (e.g., a receiving UE 115) may include a communications manager 101 and a second UE 115 (e.g., a transmitting UE 115) may include a communications manager 102. The communications manager 101 and the communications manager 102 may facilitate sidelink communications between the receiving UE 115 and the transmitting UE 115 over a sidelink communication link 135. A slot marked for sidelink may include multiple symbols. A first symbol of the slot may be a duplicate of a symbol included in a PSSCH or a PSCCH resource allocation following the first symbol and, in some cases, may be used for AGC. AGC allows a receiving UE 115 to change the gain of a received signal such that the signal falls within a range of an ADC of the receiving UE 115. An AGC process may include determining a first coarse RSSI measurement, performing a first LNA tuning based on the coarse RSSI measurement, determining a refined RSSI measurement, and then performing a second LNA tuning based on the refined RSSI measurement. Accordingly, the communications manager 101 may include an AGC manager, an LNA, and an ADC.

When operating at a 30 kHz SCS, the receiving UE 115 may perform the coarse RSSI measurement, the first LNA tuning, the refined RSSI measurement, and the second tuning within one AGC symbol. In some examples, the receiving UE 115 may operate in a higher frequency range (e.g., FR2-1 or FR2-2) with an SCS (e.g., 120 kilohertz (kHz)). Operating at the higher frequency range may result in shorter symbol durations. As such, a receiving UE 115 operating in the higher frequency range may be unable to complete AGC using the single AGC symbol.

In some examples, when a higher than 30 kHz SCS is used for sidelink communications, the UE 115 may use a modified sidelink slot structure for the sidelink communications. In one example, the slot structure may include at least two AGC symbols with at least one sidelink control channel symbol between the two AGC Symbols. The receiving UE 115 may perform the coarse RSSI measurement and the first LNA tuning during the first AGC symbol, the second RSSI measurement during the sidelink control channel symbol, and the second LNA tuning during the second AGC symbol. The receiving UE 115 may receive a physical sidelink control channel (PSCCH) signal during the sidelink control channel symbol and use the first LNA tuning based on the coarse RSSI measurement for that reception as PSCCH may operate at a low SNR.

In some examples, the slot structure may include bundled slots to minimize per slot overhead associated with sidelink control channel symbols and AGC symbols. For example, at a high SCS, the slot structure may include a first slot including multiple AGC symbols. Subsequent bundled slots may not include AGC symbols. In some examples, the first slot may also include one or more sidelink control channel symbols (e.g., for PSCCH signals), and subsequent slots may only include data symbols. The determined AGC training and corresponding LNA tuning may be applied for multiple slots. Accordingly bundling refers to applying AGC for multiple slots. The number of slots that are bundled may depend on a resource allocation associated with the sidelink communications and a capability of the receiving UE 115 to bundle slots.

Figure 2:
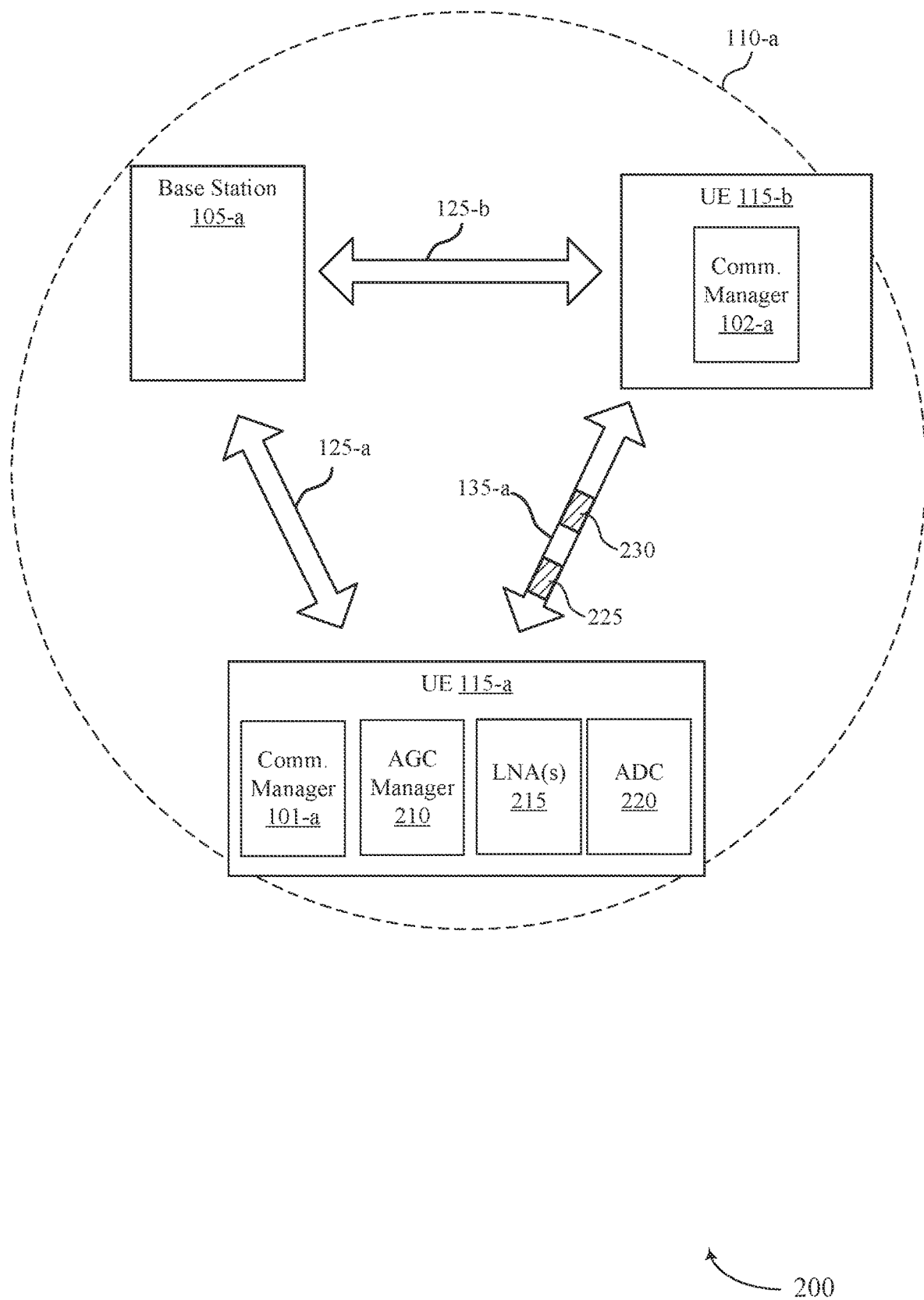
FIG. 2 illustrates an example of a wireless communications system that supports slot structure for automatic gain control for high subcarrier spacing in accordance with one or more aspects of the present disclosure.

FIG. 2 illustrates an example of a wireless communications system 200 that supports slot structure for automatic gain control for high SCS in accordance with one or more aspects of the present disclosure. The wireless communications system 200 illustrates an example of communications between a base station 105-a associated with a geographic coverage area 110-a, a UE 115-a, and a UE 115-b, which may be examples of corresponding devices described herein, including with reference to FIG. 1.

The UE 115-a and the UE 115-b may be located within the geographic coverage area 110-a of the base station 105-a and may communicate with the base station 105-a using a communication link 125-a and a communication link 125-b, respectively, which may be examples of NR or LTE links between the UE 115-a or the UE 115-b, respectively, and the base station 105-a. The communication link 125-a and the communication link 125-b, may include bi-directional links that enable both uplink and downlink communication. For example, the UE 115-a may transmit uplink signals, such as uplink control signals or uplink data signals, to the base station 105-a using the communication link 125-a and the base station 105-a may transmit downlink transmissions, such as downlink control signals or downlink data signals, to the UE 115-a using the communication link 125-a. By way of another example, the UE 115-b may transmit uplink signals, such as uplink control signals or uplink data signals, to the base station 105-a using the communication link 125-b and the base station 105-a may transmit downlink transmissions, such as downlink control signals or downlink data signals, to the UE 115-b using the communication link 125-b.

The UE 115-a may communicate with the UE 115-b using a sidelink communication link 135-a. The sidelink communication link 135-a may include a bi-directional link that enable the UE 115-a to transmit signals to and receive signals from the UE 115-b. In some examples, the base station 105-a may configure resources for the sidelink communication link 135-a. In some examples, the UE 115-a may communicate with the UE 115-b over the sidelink communication link 135-a using directional communications techniques (e.g., beamforming techniques).

In some examples, the UE 115-a may receive sidelink communications 225 from the UE 115-b. In order to receive and decode sidelink communications 225 from the UE 115-b, a communications manager 101-a at the UE 115-a may include an AGC manager 210, one or more LNAs 215, and an ADC 220. In order to transmit sidelink communications 225, the UE 115-b may include a communications manager 102-a. The function of an ADC 220 may be to transform analog signals into a digital form such that the information may be read and processed by the UE 115-a. In some examples, the ADC 220 may have an associated range, where the associated range specifies the maximum and minimum voltage that may be input into the ADC 220. In order for the ADC 220 to function properly, the received sidelink signal may be within the range of the ADC 220.

The UE 115-a may monitor a symbol of the sidelink slot for sidelink transmissions 225 from the UE 115-b and determine an amount to adjust a gain of the UE 115-a(e.g., receiver gain) such that future transmissions (e.g., PSSCH transmissions, PSCCH transmissions, or physical sidelink feedback channel (PSFCH) transmissions) may fall within the range of the ADC 220. The symbols over which the UE 115-a monitors for the sidelink transmissions 225 for the purpose of gain adjustment may be known as AGC symbols. In some examples, the first symbol of the sidelink slot (e.g., the symbol that conics before the symbols allocated for PSSCH transmissions) may be the AGC symbol for PSSCH transmissions and the AGC symbol may be a replication of the first symbol allocated for PSSCH transmissions (e.g., second symbol in the sidelink slot). Additionally, the first symbol of the symbols allocated for PSFCH may be the AGC symbol for PSFCH transmissions and the AGC symbol may be a replication of the second symbol allocated for PSFCH transmissions. In either case, a single symbol may be used for AGC.

In some examples, the sidelink communication link 135-a may be or may support a Cellular Vehicle to Everything (CV2X) mode. In CV2X, a UE 115-a may receive signals from multiple sources from varying path loss, and accordingly a dedicated single symbol may be used for AGC tuning at the beginning of every CV2X slot. As described herein, in a CV2X mode, the UE. 115-a may use the AGC symbol for RSSI measurement and LNA tuning.

In some examples, the UE 115-a and the UE 115-b may operate in high frequency ranges. For example, the UE 115-a and the UE 115-b may operate in FR2 which may include a frequency range of 24.25 GHz to 52.6 GHz. At the higher frequency range, the SCS may increase (e.g., to 120 kHz) and a duration of the symbols may decrease (e.g., to approximately 9 μsec). When compared to a lower frequency range (e.g., FR1). Because the symbol duration is relatively short, the UE 115-a may be unable to perform AGC within one symbol. Allocating multiple symbols for AGC (e.g., 4 symbols for 120 kHz), may result in high resource overhead, especially for achieving a high SNR to support 256 quadrature amplitude modulation.

As described herein, the UE 115-a and the UE 115-b may use modified slot structures to perform AGC for higher SCS. The UE 115-b may transmit, to the UE 115-a, an indication 230 of an SCS to be used for the sidelink communications 225. The UE 115-a and the UE 115-b may determine a slot structure for the sidelink communications based on the indicated SCS. In some examples, the UE 115-a and/or the UE 115-b may select the slot structure from a set of slot structures based on the SCS being above a threshold. In some examples, the threshold may be 30 kHz.

In some examples, the slot structure may include a first AGC symbol, a second AGC symbol, and at least one sidelink control channel symbol between the first AGC symbol and the second AGC symbol. In some examples, the UE 115-a may perform an AGC procedure for the sidelink communications 225 during an automatic gain control period that includes at least the first AGC symbol, the second AGC symbol, and the sidelink control channel symbol. In some examples, performing the AGC procedure may include: measuring, at a first level of granularity, a first received signal strength during the first AGC symbol; tuning one or more LNAs of the UE 115-a during the first AGC symbol and based on the first received signal strength; measuring, at a second level of granularity that is more refined than the first level of granularity, a second received signal strength during the sidelink control channel symbol; and tuning the LNA(s) of the UE 115-a during the second AGC symbol and based on the second received signal strength. The UE 115-a may receive and demodulate the remaining control and data symbols of the slot structure for the sidelink communications 225 based on applying AGC based on the AGC procedure performed during AGC period.

In some examples, the slot structure may include a set of AGC symbols within a first slot of a set of slots, where the AGC symbols pertain to the set of slots. In some examples, the slot structure may further include a sidelink control channel symbol within a first slot of the set of slots, the sidelink control channel symbol pertaining to the set of slots. In some examples, the slot structure may include a second slot including all data symbols (e.g., the second slot not including AGC symbols or sidelink control channel symbols). In some examples, a last symbol of a last slot of the set of slots of the slot structure may include a guard symbol and the last symbol of the other slots of the set of slots may include a data symbol. The UE 115-a may perform the AGC procedure during an AGC period that includes the set of AGC symbols. In some examples, performing the AGC procedure may include: measuring, at a first level of granularity, a first received signal strength during a first AGC symbol of the set of AGC symbols; tuning one or more LNAs of the UE 115-a during the first AGC symbol and based on the first received signal strength; measuring, at a second level of granularity that is more refined than the first level of granularity, a second received signal strength during a second AGC symbol of the set of AGC symbols; and tuning the LNA(s) of the UE 115-a during a third AGC symbol of the set of AGC symbols and based on the second received signal strength. The UE 115-a may receive and demodulate the remaining control and data symbols of the slots of the slot structure for the sidelink communications 225 based on applying AGC based on the AGC procedure performed during AGC period. In some examples, where the AGC symbols pertain to the set of slots, the UE 115-a may apply AGC to the set of slots. In some examples, the number of the set of slots may be based on a resource pool associated with the sidelink communications.

Figure 3:
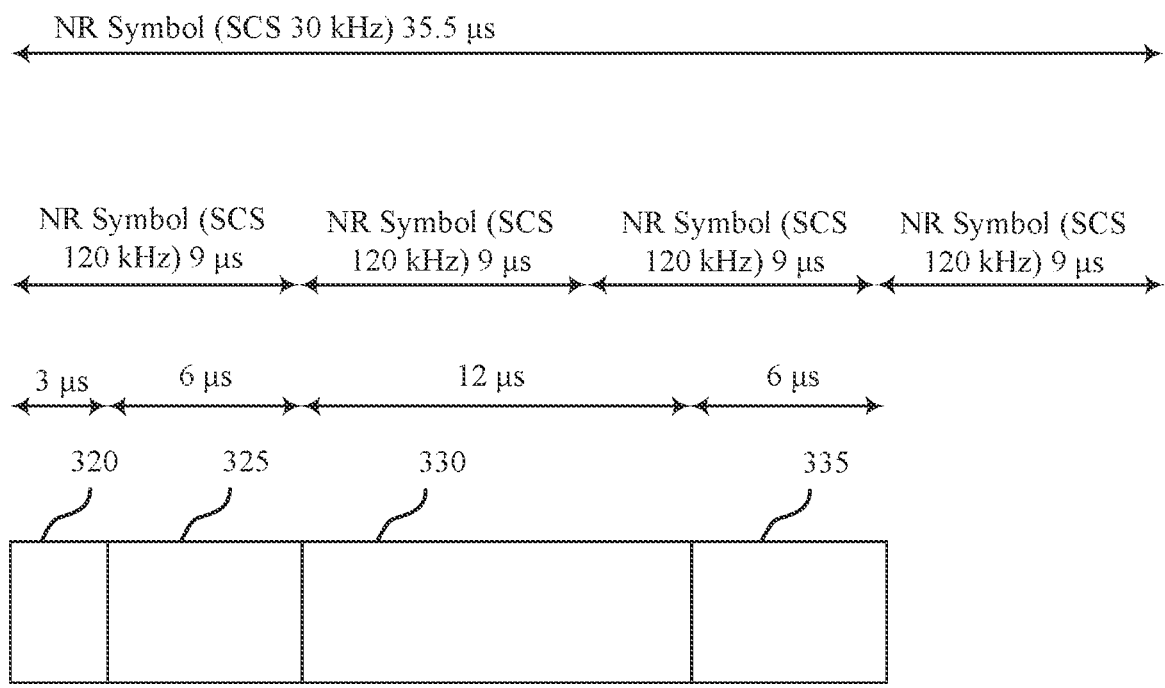
FIG. 3 illustrates an example of a timing diagram that supports slot structure for automatic gain control for high subcarrier spacing in accordance with one or more aspects of the present disclosure.

FIG. 3 illustrates an example of a timing diagram 300 that supports slot structure for automatic gain control for high SCS in accordance with one or more aspects of the present disclosure. In some examples, the timing diagram 300 may be implemented by or may implement aspects of the wireless communications system 100 or 200.

As described herein, an AGC procedure may include a first measurement step 320. The first measurement step 320 may last approximately 3 μs. During the first measurement step 320, the receiving UE 115 may perform RSSI measurements at a first level of granularity. The AGC procedure may also include a first LNA tuning period 325. The first LNA tuning period 325 may last approximately 6 μs. The first LNA tuning period 325 may include tuning one or more LNAs of the UE 115 based on the first RSSI measurements performed during the first measurement step 320. The AGC procedure may also include a second measurement step 330. The second measurement step may last approximately 12 is. During the second measurement step 330, the UE 115 may perform RSSI measurements at a second level of granularity that is more refined than the first level of granularity. The AGC procedure may also include a second LNA tuning period 335. The second LNA tuning period 335 may last approximately 6 μs. The second LNA tuning period 335 may include tuning the one or more LNAs of the UE 115 based on the first RSSI measurements performed during the second measurement step 330.

The steps (320, 325, 330, and 335) of the AGC process may last approximately 27 μs total. Accordingly, for an NR Symbol time of 35.5 μs at an SCS of 30 kHz, the UE 115 may perform the entire AGC process in a single AGC symbol. For higher SCS operations, the symbol length may decrease and the UE 115 may not be able to perform the entire AGC process in a single symbol. For example, at 120 kHz SCS, each symbol may be approximately 9 is. Accordingly, the AGC process may last 3 symbols at 120 kHz SCS. Dedicating 3 symbols to the AGC process may result in increased resource overhead.

Figure 4:
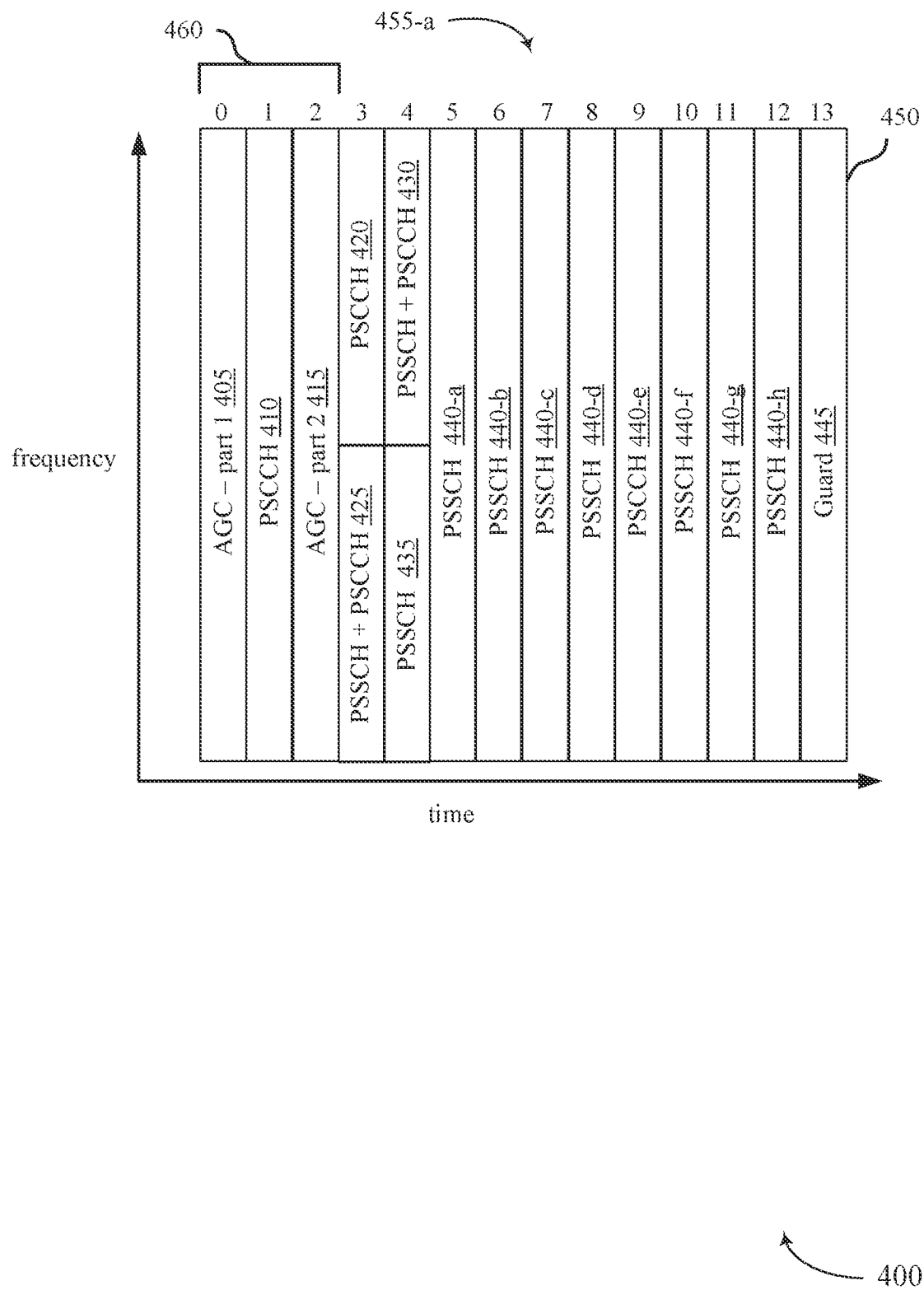
FIG. 4 illustrates an example of a resource diagram that supports slot structure for automatic gain control for high subcarrier spacing in accordance with one or more aspects of the present disclosure.

FIG. 4 illustrates an example of a resource diagram 400 that supports slot structure for automatic gain control for high SCS in accordance with one or more aspects of the present disclosure. In some examples, the resource diagram 400 may be implemented by or may implement aspects of the wireless communications system 100 or 200.

The resource diagram 400 illustrates a slot structure 455-a for high SCS sidelink communications. The slot structure 455-a includes a slot 450 including 14 symbols. The slot 450 includes a first AGC symbol 405, a second AGC symbol 415, and a sidelink control channel symbol 410 (e.g., for receiving a PSCCH transmission) between the first AGC symbol 405 and the second AGC symbol 415. In some examples, the receiving UE 115 may perform an AGC procedure for the sidelink communications during an AGC period 460 that includes at least the first AGC symbol 405, the second AGC symbol 415, and the sidelink control channel symbol 410. In some examples, performing the AGC procedure may include: measuring, at a first level of granularity, a first received signal strength during the first AGC symbol 405; tuning one or more LNA(s) of the UE 115 during the first AGC symbol 405 and based on the first received signal strength: measuring, at a second level of granularity that is more refined than the first level of granularity, a second received signal strength during the sidelink control channel symbol 410; and tuning the LNA(s) of the UE 115 during the second AGC symbol 415 and based on the second received signal strength. Half of the resources of the fourth symbol (symbol 3) may be used to receive a control signal or a data signal via resources 425, and the other half may be used to receive a control signal via resources 420. Half of the resources of the fifth symbol (symbol 4) may be used to receive a control signal or a data signal via resources 430, and the other half may be used to receive a data signal via resources 435. The sixth through thirteenth symbols (symbols 5-12) may be used as data symbols (e.g., data symbols 440-a through 440-h), and a last symbol of the slot structure may be a guard symbol 445.

After the AGC period 460, the receiving UE 115 may receive and demodulate the remaining control and data symbols of the slot structure 455-a for the sidelink communications based on applying; AGC based on the AGC procedure performed during AGC period 460. Overall, the slot structure 455-a uses 2 symbols dedicated for AGC instead of using 3 or 4 symbols, and accordingly may save resource overhead. In some examples, the first AGC symbol 405 may be a copy of the second symbol, the sidelink control channel symbol 410. In some examples, the second AGC symbol 415 may be a copy of the fourth symbol (symbol 3). In some examples, the received power of the signals received in the first AGC symbol 405 and the second AGC symbol 415 may be the same as the receive power of the other signals received in the other symbols of the slot 450.

As illustrated, the slot structure 455-a may include PSCCH spanning the frequency resources of the slot in the sidelink control channel symbol 410. If the resource allocation to the slot is small (e.g., 10 resource blocks), the PSCCH may continue into the fourth symbol (e.g., into resources 420). If the resource allocation is large, the PSCCH for the slot 450 may be entirely allocated into the second symbol (sidelink control channel symbol 410). The PSCCH may use repetition to capture the entire bandwidth allocated for the slot for the PSCCH so that the second symbol maw be used for measuring RSSI The PSCCH parts in the second and fourth symbols (e.g., symbols 1 and 3) may have different AGC states (e.g., the PSCCH in symbol 1 may use the AGC state after course LNA tuning and the PSCCH in symbol 3 may use the AGC state after the refined LNA tuning) and may be demodulated separately and combined for polar decoding. The second part of the PSCCH in resources 425 and resources 430 may be pail of the PSSCH for demodulation purposes.

Figure 5:
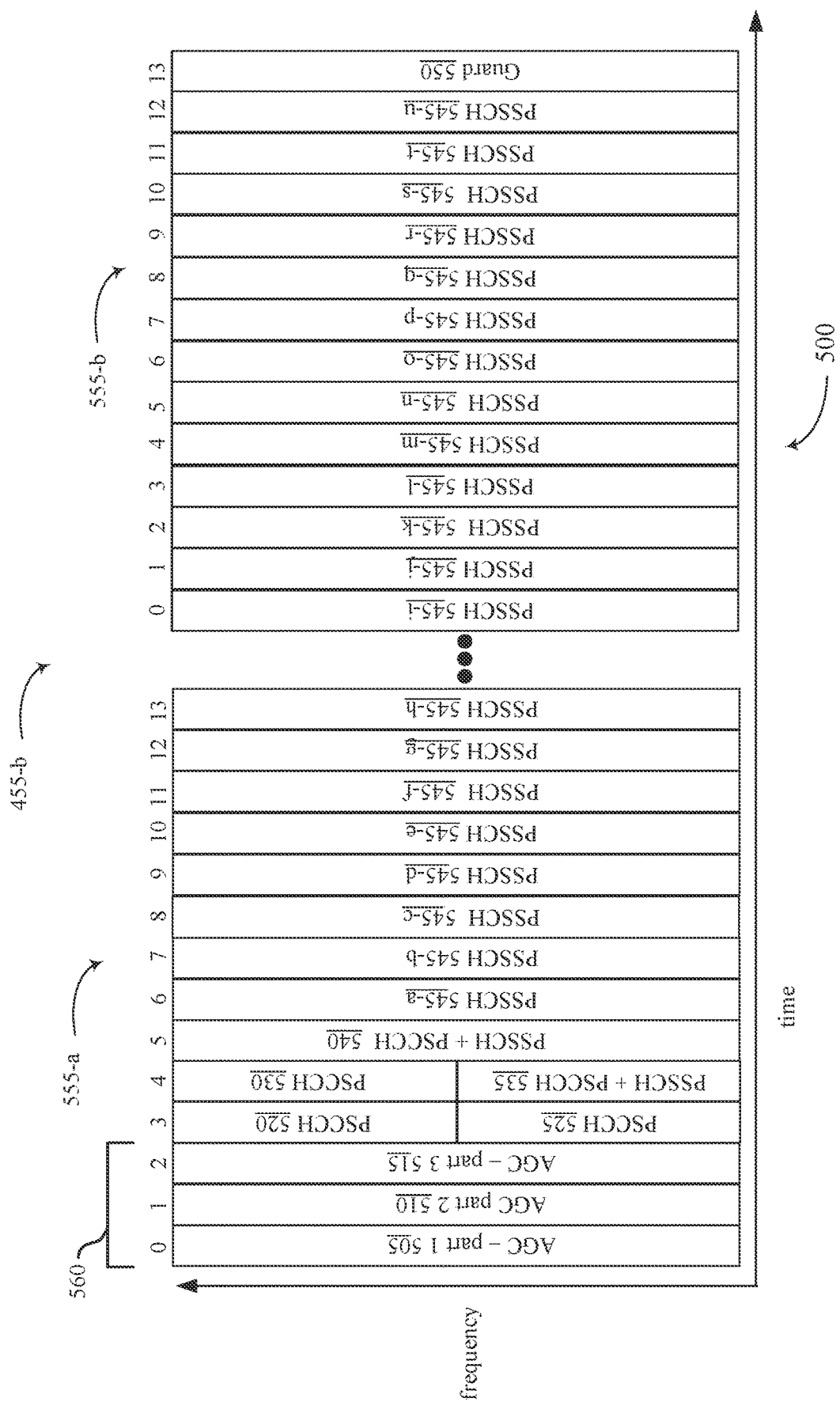
FIG. 5 illustrates an example of a resource diagram that supports slot structure for automatic gain control for high subcarrier spacing in accordance with one or more aspects of the present disclosure.

FIG. 5 illustrates an example of a resource diagram 500 that supports slot structure for automatic gain control for high SCS in accordance with one or more aspects of the present disclosure. In some examples, the resource diagram 500 may be implemented by or may implement aspects of the wireless communications system 100 or 200.

The resource diagram 500 illustrates a slot structure 455-b for high SCS sidelink communications. The slot structure 455-b may include a set of AGC symbols 560 within a first slot 555-a of a set of slots 555, where the set AGC symbols 560 pertain to the set of slots 555. The set of AGC symbols 560 may include a first AGC symbol 505 in symbol 0, a second AGC symbol 510 in symbol 1, and a third AGC symbol 515 in symbol 2. In some examples, the slot structure 455-b may further include one or more sidelink control channel symbol within the first slot 555-a of the set of slots 555, the sidelink control channel symbol pertaining to the set of slots 555. For example, the first slot 555-a may include sidelink control channel resources 520, 525, 530, 535, and 540 in symbols 3, 4, and 4 of the first slot 555-a. The remaining symbols (symbols 5 through 13) of the first slot 555-a may be data symbols 545-a through 545-h.

In some examples, the slot structure 455-b may include a second slot including all data symbols (e.g., the second slot not including AGC symbols or sidelink control channel symbols). In some examples, a last symbol (symbol 13) of a last slot 555-b of the set of slots 555 of the slot structure 455-b may include a guard symbol 550 and the last symbol of the other slots of the set of slots 555 may include a data symbol. The other symbols (symbols 0-12) of the last slot 555-b may include data symbols 545-i through 545-u.

The UE 115-a may perform the AGC procedure during an AGC period that includes the set of AGC symbols 560. In some examples, performing the AGC procedure may include: measuring, at a first level of granularity, a first received signal strength during the first AGC symbol 505 of the set of AGC symbols 560: tuning one or more LNAs of the UE 115 during the first AGC symbol 505 and based on the first received signal strength; measuring, at a second level of granularity that is more refined than the first level of granularity, a second received signal strength during a second AGC symbol 510 of the set of AGC symbols 560; and tuning the LNA(s) of the UE 115 during a third AGC symbol 515 of the set of AGC symbols 560 and based on the second received signal strength. In some examples, the received power of the signals received in the first AGC symbol 505, the second AGC symbol 510, and the third AGC symbol 515 may be the same as the receive power of the other signals received in the other symbols of the slots 555.

The UE 115 may receive and demodulate the remaining control and data symbols of the slots of the slot structure 455-b for the sidelink communications based on applying AGC based on the AGC procedure performed during the AGC symbols 560. In some examples, where the AGC symbols 560 pertain to the set of slots, the UE 115-a may apply AGC to the set of slots 555. In some examples, the number of the set of slots 555 may be based on a resource pool associated with the sidelink communications.

Bundling slots (e.g., using the AGC procedure in the first slot 555-a for the set of slots 555) may reduce resource overhead associated with AGC. All slots in the bundled set of slots 555 may have the same resource allocation (e.g., frequency resources), and slots may be bundled per resource allocation. In some examples, the bundle size (e.g., the number of slots bundled together) may be based on the resource pool size (e.g., may be a property of the resource pool of the sidelink communications), In some examples, the bundle size may be based on a capability of the UE 115 to bundle slots together (e.g., based on a capability of the UE 115 to apply AGC tuning across slots of the transmitting UE 115 to maintain transmission phase or power continuity across slots) For example, phase continuity between slots in the same bundle may or may not be preserved based on the capability of the transmitting UE 115 or a property of the resource pool. If phase continuity is enable, the transmitting UE 115 may enable demodulation reference signal structures to optimize AGC performance and reduce overhead.

Figure 6:
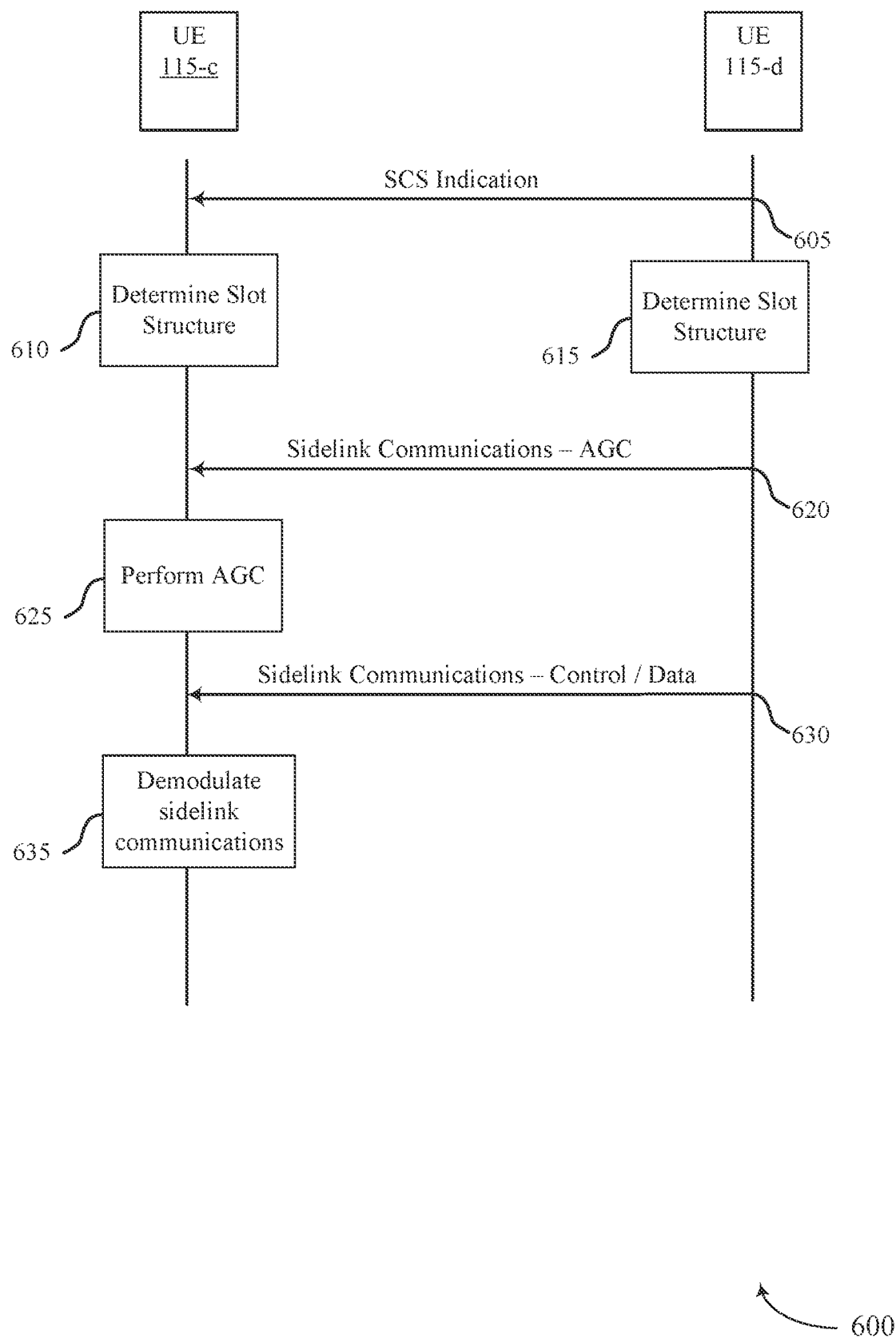
FIG. 6 illustrates an example of a process flow that supports slot structure for automatic gain control for high subcarrier spacing in accordance with one or more aspects of the present disclosure.

FIG. 6 illustrates an example of a process flow 600 that supports slot structure for automatic gain control for high SCS in accordance with one or more aspects of the present disclosure. In some examples, the process flow 600 may be implemented by or may implement aspects of the wireless communications system 100 or 200. The process flow 600 may include a UE 115-c and a UP 115-d, which may examples of a UE 115 as described herein. In the following description of the process flow 600, the operations between the UE 115-c and the UT 115-d may be transmitted in a different order than the example order shown, or the operations performed by the UE 115-c and the UE 115-d may be performed in different orders or at different times. Some operations may also be omitted from the process flow 600, and other operations may be added to the process flow 600.

At 605, the UE 115-d may transmit, to the UE 115-c, an indication of an SCS to be used for sidelink communications between the UE 115-d and the UE 115-c.

At 610, the UE 115-c may determine a slot structure for the sidelink communications based on the indicated SCS. At 615, the UE 115-d may determine the slot structure for the sidelink communications based on the indicated SCS. In some examples, the UE 115-c and/or the UE 115-d may select the slot structure from a set of slot structures based on the SCS being above a threshold. In some examples, the threshold may be 30 kHz. In some examples, the UE 115-c may indicate the slot structure to the UE 115-d, In some examples, the UE 115-d may indicate the slot structure to the UE 115-c. In some examples, the network (e.g., a serving base station) may configure the SCS and the slot structure for the sidelink communications.

In some examples, the slot structure may include a first AGC symbol, a second AGC symbol, and a sidelink control channel symbol between the first AGC symbol and the second AGC symbol.

In some examples, at 620, the UE 115-*d* may transmit sidelink communications including the AGC symbols. In some examples, the UE 115-*c* may receive, from the UE 115-*d*, a first instance of a first signal during the temporally first symbol of the slot structure and a second instance of the first signal during a temporally second symbol of the slot structure, where the temporally first symbol of the slot structure is the first AGC symbol, and the temporally second symbol of the slot structure is the sidelink control channel symbol. In some examples, the UE 115-*c* may receive, in the sidelink control channel symbol, a sidelink control channel signal spanning a resource allocation of a sidelink shared channel associated with the sidelink control channel signal, the sidelink control channel symbol being a temporally second symbol of the slot structure.

In some examples, at 625 in some examples the UE 115-*c* may perform an AGC procedure for the sidelink communications during an AGC period that includes at least the first AGC symbol, the second AGC symbol, and the sidelink control channel symbol. In some examples, performing the AGC procedure may include: measuring, at a first level of granularity, a first received signal strength during the first AGC symbol; tuning an LNA of the UE 115-*c* during the first AGC symbol and based on the first received signal strength; measuring, at a second level of granularity that is more refined than the first level of granularity, a second received signal strength during the sidelink control channel symbol; and tuning the LNA of the UE 115-*c* during the second AGC symbol and based on the second received signal strength.

In some examples, at 630, the UE 115-*d* may transmit sidelink communications in accordance with the slot structure including control and/or data symbols. In some examples, in the temporally fourth symbol of the slot structure, and following the second AGC symbol a second portion of the sidelink control the UE 115-*c* may receive a second portion of the sidelink control channel signal spanning a portion of the sidelink resource allocation.

In some examples, at 635 the UE 115-*c* may receive and demodulate the sidelink communications received at 630 based on applying AGC based on the AGC procedure performed at 625. In some examples, the UE 115-*c* may apply AGC based on the AGC procedure performed at 625 to a set of bundled slots.

In some examples, the UE. 115-*c* may receive, from the UE 115-*d*, a first instance of a second signal during a temporally third symbol of the slot structure, and a second instance of the second signal during a temporally fourth symbol of the slot structure, where the temporally third symbol of the slot structure is the second AGC symbol. In some examples, the UE 115-*c* may receive, from the UE 115-*d*, a first instance of a first signal during the first AGC symbol, a second instance of the first signal during the slot structure, a first instance of a second signal during the second automatic gain control symbol, and a second instance of the second signal during the slot structure. In some examples, the UE 115-*c* may receive, from the UE. 115-*d*, a first signal during the first automatic gain control symbol, and a second signal during, the second automatic gain control symbol, where the first AGC symbol and the second AGC symbol are both of a same receive power as the other signals received during other symbols of the slot structure received at 630.

Returning to 610 and 615, in some examples, the slot structure may include a set of AGC symbols within a first slot of a set of slots, where the AGC symbols pertain to the set of slots. In some examples, the slot structure may further include a sidelink control channel symbol within a first slot of the set of slots, the sidelink control channel symbol pertaining to the set of slots. In some examples, the slot structure may include a second slot including all data symbols (e.g., the second slot not including AGC symbols or sidelink control channel symbols). In some examples, a last symbol of a last slot of the set of slots of the slot structure may include a guard symbol and the last symbol of the other slots of the set of slots may include a data symbol.

In some examples, where the AGC symbols pertain to the set of slots, at 625, the UE 115-*c* may perform the AGC procedure during an AGC period that includes the set of AGC symbols. In son examples, performing the AGC procedure at 625 may include: measuring, at a first level of granularity, a first received signal strength during a first AGC symbol of the set of AGC symbols; tuning a LNA of the UE 115-*c* during the first AGC symbol and based on the first received signal strength; measuring, at a second level of granularity that is more refined than the first level of granularity, a second received signal strength during a second AGC symbol of the set of AGC symbols; and tuning the LNA of the UE 115-*c* during a third AGC symbol of the set of AGC symbols and based on the second received signal strength.

In some examples, where the AGC symbols pertain to the set of slots, at 635 the UE 115-*c* may apply AGC to the set of slots. In some examples, the number of the set of slots may be based on a resource pool associated with the sidelink communications.

Figure 7:
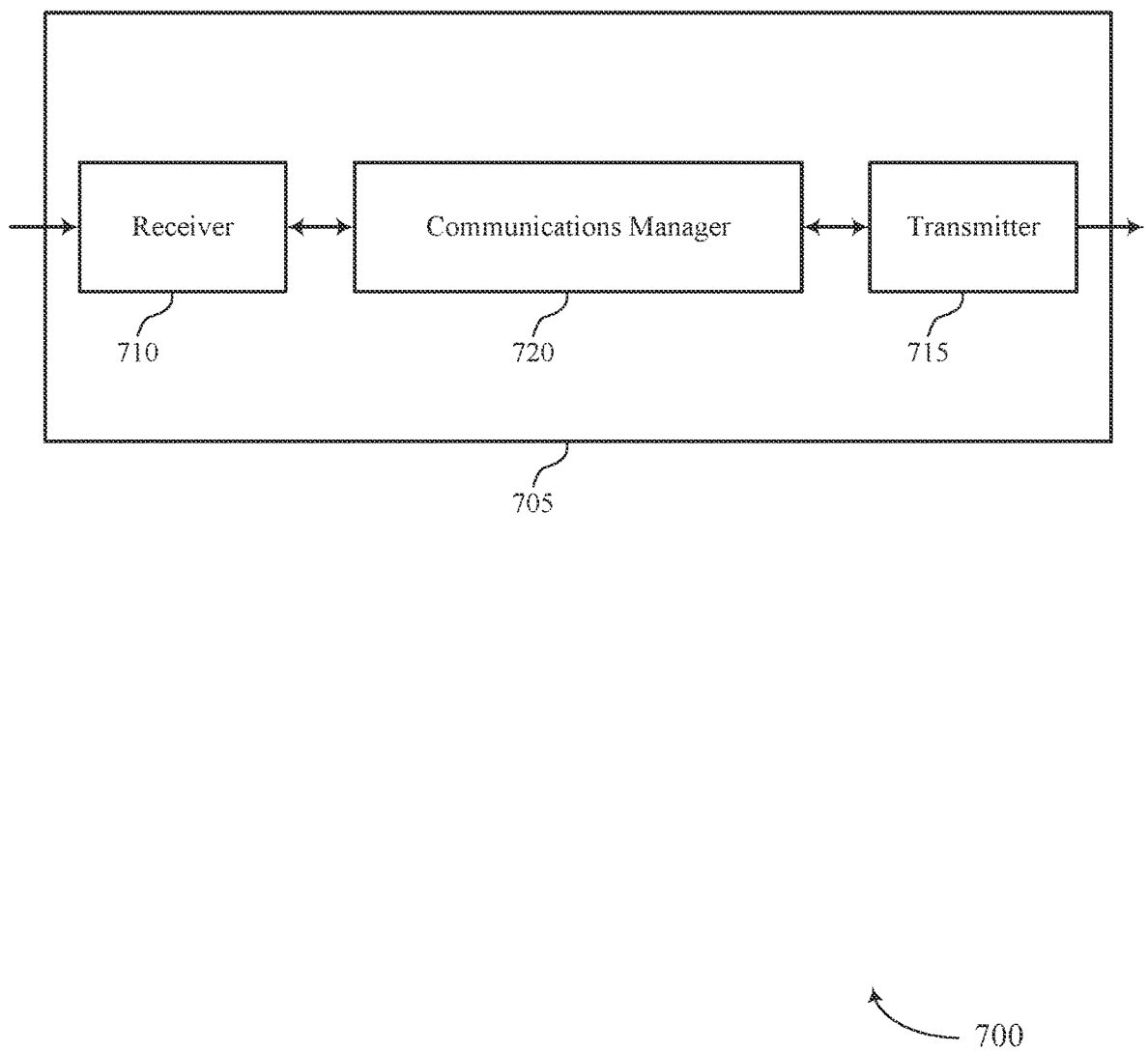
FIGS. 7 and 8 show block diagrams of devices that support slot structure for automatic gain control for high subcarrier spacing in accordance with one or more aspects of the present disclosure.

FIG. 7 shows a block diagram 700 of a device 705 that supports slot structure for automatic gain control for high SCS in accordance with one or more aspects of the present disclosure. The device 705 may be an example of aspects of a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to slot structure for automatic gain control for high SCS). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to slot structure for automatic gain control for high SCS). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of slot structure for automatic gain control for high SCS as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using; or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first UE in accordance with examples as disclosed herein. For example, the communications manager 720 may be configured as or otherwise support a means for receiving an indication of an SCS to be used for sidelink communications between the first UE and one or more second UEs. The communications manager 720 may be configured as or otherwise support a means for receiving the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol. The communications manager 720 may be configured as or otherwise support a means for performing an automatic gain control procedure for the sidelink communications during an automatic gain control period that includes at least the first automatic gain control symbol and the second automatic gain control symbol.

Additionally or alternatively, the communications manager 720 may support wireless communications at a first UE in accordance with examples as disclosed herein. For example, the communications manager 720 may be configured as or otherwise support a means for receiving an indication of an SCS to be used for sidelink communications between the first UE and one or more second UEs. The communications manager 720 may be configured as or otherwise support a means for receiving the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots. The communications manager 720 may be configured as or otherwise support a means for performing an automatic gain control procedure for the sidelink communications during an automatic gain control period that includes the set of multiple automatic gain control symbols.

Additionally or alternatively, the communications manager 720 may support wireless communications at a second UE in accordance with examples as disclosed herein. For example, the communications manager 720 may be configured as or otherwise support a means for transmitting, to a first UE, an indication of an SCS to be used for sidelink communications between the first UE and the second UE. The communications manager 720 may be configured as or otherwise support a means for transmitting, to the first UE, the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol.

Additionally or alternatively, the communications manager 720 may support wireless communications at a second UE in accordance with examples as disclosed herein. For example, the communications manager 720 may be configured as or otherwise support a means for transmitting, to a first UE, an indication of an SCS to be used for sidelink communications between the first UE and the second UE. The communications manager 720 may be configured as or otherwise support a means for transmitting, to the first UE, the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for more efficient utilization of communication resources via enabling a UE to perform an AGC process at high SCS.

Figure 8:
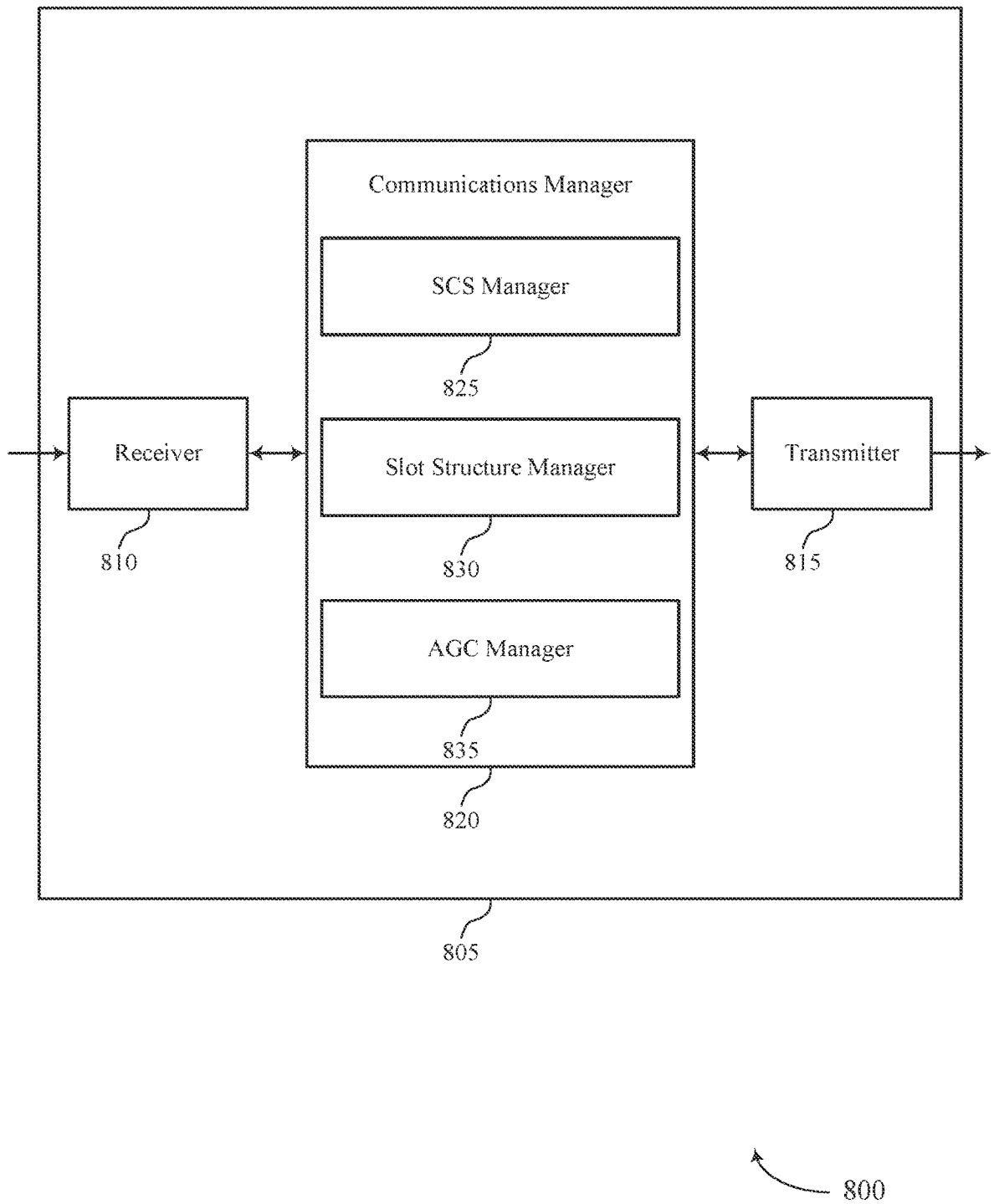

FIG. 8 shows a block diagram 800 of a device 805 that supports slot structure for automatic gain control for high SCS in accordance with one or more aspects of the present disclosure. The device 805 may be an example of aspects of a device 705 or a UE 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to slot structure for automatic gain control for high SCS). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to slot structure for automatic gain control for high SCS). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of slot structure for automatic gain control for high SCS as described herein. For example, the communications manager 820 may include an SCS manager 825, a slot structure manager 830, an AGC manager 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at a first UE in accordance with examples as disclosed herein. The SCS manager 825 may be configured as or otherwise support a means for receiving an indication of an SCS to be used for sidelink communications between the first UE and one or more second UEs. The slot structure manager 830 may be configured as or otherwise support a means for receiving the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol. The AGC manager 835 may be configured as or otherwise support a means for performing an automatic gain control procedure for the sidelink communications during an automatic gain control period that includes at least the first automatic gain control symbol and the second automatic gain control symbol.

Additionally or alternatively, the communications manager 820 may support wireless communications at a first UE in accordance with examples as disclosed herein. The SCS manager 825 may be configured as or otherwise support a means for receiving an indication of an SCS to be used for sidelink communications between the first UE and one or more second UEs. The slot structure manager 830 may be configured as or otherwise support a means for receiving the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots. The AGC manager 835 may be configured as or otherwise support a means for performing an automatic gain control procedure for the sidelink communications during an automatic gain control period that includes the set of multiple automatic gain control symbols.

Additionally or alternatively, the communications manager 820 may support wireless communications at a second UE in accordance with examples as disclosed herein. The SCS manager 825 may be configured as or otherwise support a means for transmitting, to a first UE, an indication of an SCS to be used for sidelink communications between the first UE and the second UE. The slot structure manager 830 may be configured as or otherwise support a means for transmitting, to the first UE, the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol.

Additionally or alternatively, the communications manager 820 may support wireless communications at a second UE in accordance with examples as disclosed herein. The SCS manager 825 may be configured as or otherwise support a means for transmitting, to a first UE, an indication of an SCS to be used for sidelink communications between the first UE and the second UE. The slot structure manager 830 may be configured as or otherwise support a means for transmitting, to the first UE, the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots.

Figure 9:
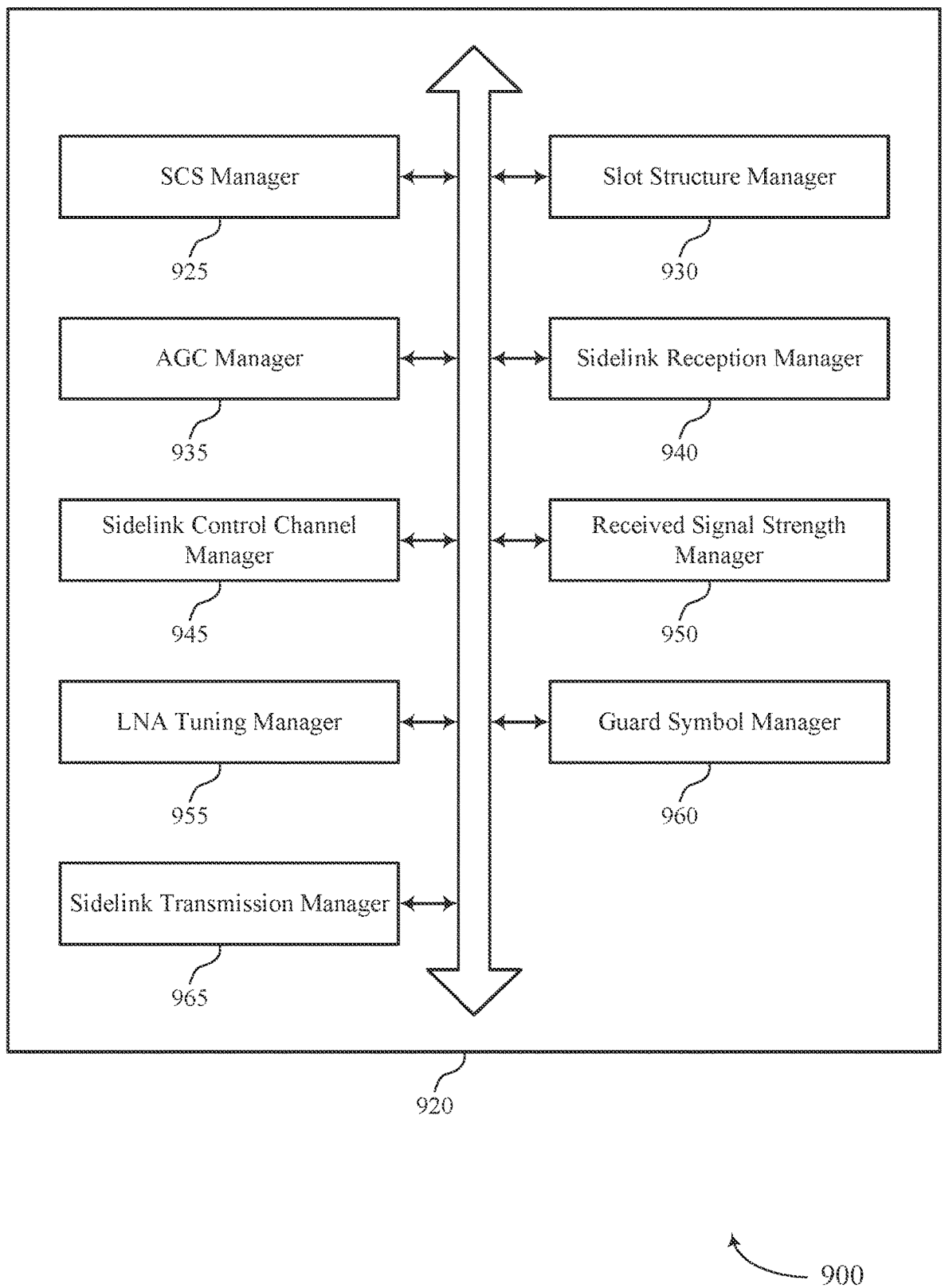
FIG. 9 shows a block diagram of a communications manager that supports slot structure for automatic gain control for high subcarrier spacing in accordance with one or more aspects of the present disclosure.

FIG. 9 shows a block diagram 900 of a communications manager 920 that supports slot structure for automatic gain control for high SCS in accordance with one or more aspects of the present disclosure. The communications manager 920 may be an example of aspects of a communications manager 720, a communications manager 820, or both, as described herein. The communications manager 920, or various components thereof, may be an example of means for performing various aspects of slot structure for automatic gain control for high SCS as described herein. For example, the communications manager 920 may include an SCS manager 925, a slot structure manager 930, an AGC manager 935, a sidelink reception manager 940, a sidelink control channel manager 945, a received signal strength manager 950, an LNA tuning manager 955, a guard symbol manager 960, a sidelink transmission manager 965, or any combination thereof. Each of these components may communicate, directly or indirectly, with one another (e.g., via one or more buses).

The communications manager 920 may support wireless communications at a first UE in accordance with examples as disclosed herein. The SCS manager 925 may be configured as or otherwise support a means for receiving an indication of an SCS to be used for sidelink communications between the first UE and one or more second UEs. The slot structure manager 930 may be configured as or otherwise support a means for receiving the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol. The AGC manager 935 may be configured as or otherwise support a means for performing an automatic gain control procedure for the sidelink communications during an automatic gain control period that includes at least the first automatic gain control symbol and the second automatic gain control symbol.

In some examples, the sidelink reception manager 940 may be configured as or otherwise support a means for applying, based on the automatic gain control procedure, an automatic gain control to the sidelink communications that occur over a set of multiple slots.

In some examples, the sidelink reception manager 940 may be configured as or otherwise support a means for receiving a first instance of a first signal during a temporally first symbol of the slot structure. In some examples, the sidelink reception manager 940 may be configured as or otherwise support a means for receiving a second instance of the first signal during a temporally second symbol of the slot structure, where the temporally first symbol of the slot structure is the first automatic gain control symbol, and where the temporally second symbol of the slot structure is the sidelink control channel symbol.

In some examples, the sidelink reception manager 940 may be configured as or otherwise support a means for receiving a first instance of a second signal during a temporally third symbol of the slot structure. In some examples, the sidelink reception manager 940 may be configured as or otherwise support a means for receiving a second instance of the second signal during a temporally fourth symbol of the slot structure, where the temporally third symbol of the slot structure is the second automatic gain control symbol.

In some examples, the sidelink reception manager 940 may be configured as or otherwise support a means for receiving a first instance of a first signal during the first automatic gain control symbol. In some examples, the sidelink reception manager 940 may be configured as or otherwise support a means for receiving a second instance of the first signal during the slot structure. In some examples, the sidelink reception manager 940 may be configured as or otherwise support a means for receiving a first instance of a second signal during the second automatic gain control symbol. In some examples, the sidelink reception manager 940 may be configured as or otherwise support a means for receiving a second instance of the second signal during the slot structure.

In some examples, the sidelink reception manager 940 may be configured as or otherwise support a means for receiving a first signal during the first automatic gain control symbol. In some examples, the sidelink reception manager 940 may be configured as or otherwise support a means for receiving a second signal during the second automatic gain control symbol, where the first automatic gain control symbol and the second automatic gain control symbol are both of a same receive power as other signals received during other symbols of the slot structure.

In some examples, the sidelink control channel manager 945 may be configured as or otherwise support a means for receiving, in the sidelink control channel symbol, a sidelink control channel signal spanning a resource allocation of a sidelink shared channel associated with the sidelink control channel signal, the sidelink control channel symbol being a temporally second symbol of the slot structure.

In some examples, the sidelink reception manager 940 may be configured as or otherwise support a means for receiving, in a temporally fourth symbol of the slot structure and following the second automatic gain control symbol, a second portion of the sidelink control channel signal spanning a portion of the resource allocation.

In some examples, the sidelink reception manager 940 may be configured as or otherwise support a means for demodulating the sidelink control channel signal received in the temporally second symbol and the second portion of the sidelink control channel signal received in the temporally fourth symbol separately.

In some examples, the received signal strength manager 950 may be configured as or otherwise support a means for measuring, at a first level of granularity, a first received signal strength during the first automatic gain control symbol. In some examples, the LNA tuning manager 955 may be configured as or otherwise support a means for tuning a low noise amplifier of the first UE during the first automatic gain control symbol and based on the first received signal strength. In some examples, the received signal strength manager 950 may be configured as or otherwise support a means for measuring, at a second level of granularity that is more refined than the first level of granularity, a second received signal strength during the sidelink control channel symbol. In some examples, the LNA tuning manager 955 may be configured as or otherwise support a means for tuning the low noise amplifier of the first UE during the second automatic gain control symbol and based on the second received signal strength.

In some examples, the slot structure manager 930 may be configured as or otherwise support a means for selecting the slot structure from a set of multiple available slot structures based on the SCS being above an SCS threshold.

In some examples, the SCS threshold is 30 kilohertz.

Additionally or alternatively, the communications manager 920 may support wireless communications at a first UE in accordance with examples as disclosed herein. In some examples, the SCS manager 925 may be configured as or otherwise support a means for receiving an indication of an SCS to be used for sidelink communications between the first UE and one or more second UEs. In some examples, the slot structure manager 930 may be configured as or otherwise support a means for receiving the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots. In some examples, the AGC manager 935 may be configured as or otherwise support a means for performing an automatic gain control procedure for the sidelink communications during an automatic gain control period that includes the set of multiple automatic gain control symbols.

In some examples, the slot structure further includes a sidelink control channel symbol within a first slot of a set of multiple slots, the sidelink control channel symbol pertaining to the set of multiple slots.

In some examples, the sidelink control channel manager 945 may be configured as or otherwise support a means for receiving a sidelink control channel message during the sidelink control channel symbol which is between instances of the automatic gain control symbols of the set of multiple automatic gain control symbols in the first slot.

In some examples, the sidelink control channel manager 945 may be configured as or otherwise support a means for receiving a sidelink control channel message during the sidelink control channel symbol which is after the set of multiple automatic gain control symbols in the first slot.

In some examples, the sidelink reception manager 940 may be configured as or otherwise support a means for receiving the sidelink communications, at least in part, during a second slot of the set of multiple slots, the second slot including a set of multiple symbols, each symbol of the set of multiple symbols including a data symbol.

In some examples, the sidelink reception manager 940 may be configured as or otherwise support a means for receiving a first signal during a first automatic gain control symbol of the set of multiple automatic gain control symbols. In some examples, the sidelink reception manager 940 may be configured as or otherwise support a means for receiving a second signal during a second automatic gain control symbol of the set of multiple automatic gain control symbols, where the first automatic gain control symbol and the second automatic gain control symbol are both of a same receive power as other signals received during other symbols of the slot structure.

In some examples, the sidelink reception manager 940 may be configured as or otherwise support a means for applying a result of the automatic gain control procedure to the set of multiple slots, where a number of slots of the set of multiple slots is based on a resource pool associated with the sidelink communications.

In some examples, the guard symbol manager 960 may be configured as or otherwise support a means for receiving the sidelink communications, at least in part, during a temporally last slot of the set of multiple slots, where the temporally last slot includes a guard symbol as a temporally last symbol of the temporally last slot, a respective temporally last symbol of other slots of the set of multiple slots including a data symbol.

In some examples, the received signal strength manager 950 may be configured as or otherwise support a means for measuring, at a first level of granularity, a first received signal strength during a first automatic gain control symbol of the set of multiple automatic gain control symbols. In some examples, the LNA tuning manager 955 may be configured as or otherwise support a means for tuning a low noise amplifier of the first UE during the first automatic gain control symbol and based on the first received signal strength. In some examples, the received signal strength manager 950 may be configured as or otherwise support a means for measuring, at a second level of granularity that is more refined than the first level of granularity, a second received signal strength during a second automatic gain control symbol of the set of multiple automatic gain control symbols. In some examples, the LNA tuning manager 955 may be configured as or otherwise support a means for tuning the low noise amplifier of the first UE during a third automatic gain control symbol of the set of multiple automatic gain control symbols and based on the second received signal strength.

In some examples, the slot structure manager 930 may be configured as or otherwise support a means for selecting the slot structure from a set of multiple available slot structures based on the SCS being above an SCS threshold.

In some examples, the SCS threshold includes 30 kilohertz.

Additionally or alternatively, the communications manager 920 may support wireless communications at a second UE in accordance with examples as disclosed herein. In some examples, the SCS manager 925 may be configured as or otherwise support a means for transmitting, to a first UE, an indication of an SCS to be used for sidelink communications between the first UE and the second UE. In some examples, the slot structure manager 930 may be configured as or otherwise support a means for transmitting, to the first UE, the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol.

In some examples, the sidelink transmission manager 965 may be configured as or otherwise support a means for transmitting a first instance of a first signal during a temporally first symbol of the slot structure. In some examples, the sidelink transmission manager 965 may be configured as or otherwise support a means for transmitting a second instance of the first signal during a temporally second symbol of the slot structure, where the temporally first symbol of the slot structure is the first automatic gain control symbol, and where the temporally second symbol of the slot structure is the sidelink control channel symbol.

In some examples, the sidelink transmission manager 965 may be configured as or otherwise support a means for transmitting a first instance of a second signal during temporally third symbol of the slot structure. In some examples, the sidelink transmission manager 965 may be configured as or otherwise support a means for transmitting a second instance of the second signal during a temporally fourth symbol of the slot structure, where the temporally third symbol of the slot structure is the second automatic gain control symbol.

In some examples, the sidelink transmission manager 965 may be configured as or otherwise support a means for transmitting a first instance of a first signal during the first automatic gain control symbol In some examples, the sidelink transmission manager 965 may be configured as or otherwise support a means for transmitting a second instance of the first signal during the slot structure. In some examples, the sidelink transmission manager 965 may be configured as or otherwise support a means for transmitting a first instance of a second signal during the second automatic gain control symbol. In some examples, the sidelink transmission manager 965 may be configured as or otherwise support a means for transmitting a second instance of the second signal during the slot structure.

In some examples, the sidelink transmission manager 965 may be configured as or otherwise support a means for transmitting a first signal during the first automatic gain control symbol. In some examples, the sidelink transmission manager 965 may be configured as or otherwise support a means for transmitting a second signal during the second automatic gain control symbol, where the first automatic gain control symbol and the second automatic gain control symbol are both of a same transmit power as other signals received during other symbols of the slot structure.

In some examples, the sidelink control channel manager 945 may be configured as or otherwise support a means for transmitting, in the sidelink control channel symbol, a sidelink control channel signal spanning a resource allocation of a sidelink shared channel associated with the sidelink control channel signal, the sidelink control channel symbol being a temporally second symbol of the slot structure.

In some examples, the sidelink transmission manager 965 may be configured as or otherwise support a means for transmitting, in a temporally fourth symbol of the slot structure and following the second automatic gain control symbol, a second portion of the sidelink control channel signal spanning a portion of the resource allocation.

In son examples, the slot structure manager 930 may be configured as or otherwise support a means for selecting the slot structure from a set of multiple available slot structures based on the SCS being above an SCS threshold.

In some examples, the SCS threshold is 30 kilohertz.

Additionally or alternatively, the communications manager 920 may support wireless communications at a second UE in accordance with examples as disclosed herein. In some examples, the SCS manager 925 may be configured as or otherwise support a means for transmitting, to a first UE, an indication of an SCS to be used for sidelink communications between the first UE and the second UE. In some examples, the slot structure manager 930 may be configured as or otherwise support a means for transmitting, to the first UE, the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots.

In some examples, the slot structure further includes a sidelink control channel symbol within a first slot of a set of multiple slots, the sidelink control channel symbol pertaining to the set of multiple slots.

In some examples, the sidelink control channel manager 945 may be configured as or otherwise support a means for transmitting a sidelink control channel message during the sidelink control channel symbol which is between instances of the automatic gain control symbols of the set of multiple automatic gain control symbols in the first slot.

In some examples, the sidelink control channel manager 945 may be configured as or otherwise support a means for transmitting a sidelink control channel message during the sidelink control channel symbol which is after the set of multiple automatic gain control symbols in the first slot.

In some examples, the sidelink transmission manager 965 may be configured as or otherwise support a means for transmitting the sidelink communications, at least in part, during a second slot of the set of multiple slots, the second slot including a set of multiple symbols, each symbol of the set of multiple symbols including a data symbol.

In some examples, the sidelink transmission manager 965 may be configured as or otherwise support a means for transmitting a first signal during a first automatic gain control symbol of the set of multiple automatic gain control symbols. In some examples, the sidelink transmission manager 965 may be configured as or otherwise support a means for transmitting a second signal during a second automatic gain control symbol of the set of multiple automatic gain control symbols, where the first automatic gain control symbol and the second automatic gain control symbol are both of a same receive power as other signals received during other symbols of the slot structure.

In some examples, the sidelink transmission manager 965 may be configured as or otherwise support a means for transmitting the sidelink communications, at least in part, during a temporally last slot of the set of multiple slots, where the temporally last slot includes a guard symbol as a temporally last symbol of the temporally last slot, a respective temporally last symbol of other slots of the set of multiple slots including a data symbol.

In some examples, the slot structure manager 930 may be configured as or otherwise support a means for selecting the slot structure from a set of multiple available slot structures based on the SCS being above an SCS threshold.

In some examples, the SCS threshold includes 30 kilohertz.

Figure 10:
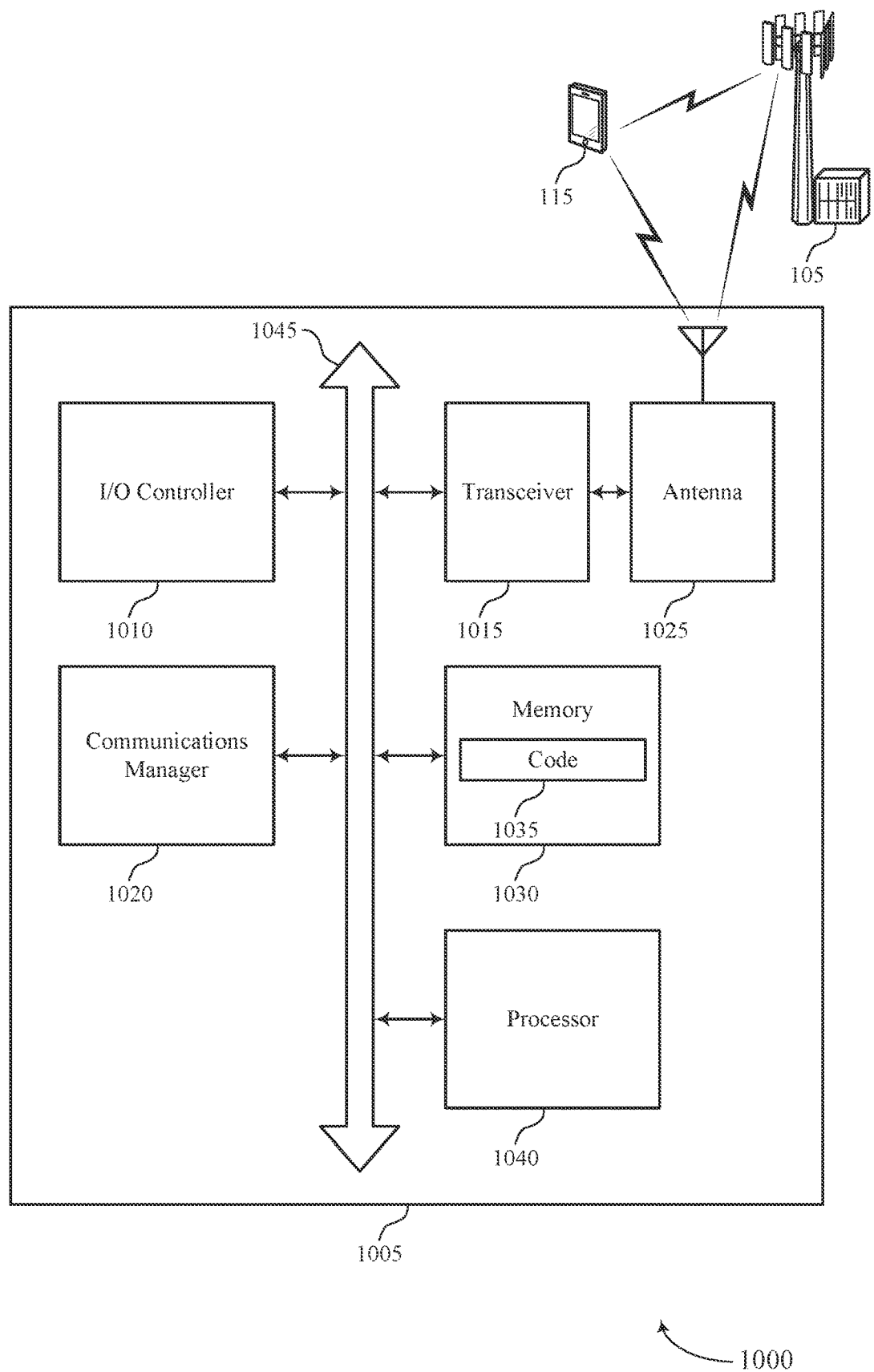
FIG. 10 shows a diagram of a system including a device that supports slot structure for automatic gain control for high subcarrier spacing in accordance with one or more aspects of the present disclosure.

FIG. 10 shows a diagram of a system 1000 including a device 1005 that supports slot structure for automatic gain control for high SCS in accordance with one or more aspects of the present disclosure. The device 1005 may be an example of or include the components of a device 705, a device 805, or a UE 115 as described herein. The device 1005 may communicate wirelessly with one or more base stations 105, UEs 115, or any combination thereof. The device 1005 may include components for bi-directional voice and data communications including components for transmitting and receiving communications, such as a communications manager 1020, an input/output (I/O) controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1040 may be configured to operate a memory array using a memory controller. In some other cases, an memory controller may be integrated into the processor 1040. The processor 1040 may be configured to execute computer-readable instructions stored in a memory (e.g., the memory 1030) to cause the device 1005 to perform various functions (e.g. functions or tasks supporting slot structure for automatic gain control for high SCS). For example, the device 1005 or a component of the device 1005 may include a processor 1040 and memory 1030 coupled with or to the processor 1040, the processor 1040 and memory 1030 configured to perform various functions described herein.

The communications manager 1020 may support wireless communications at a first UE in accordance with examples as disclosed herein. For example, the communications manager 1020 may be configured as or otherwise support a means for receiving an indication of an SCS to be used for sidelink communications between the first UE and one or more second UEs. The communications manager 1020 may be configured as or otherwise support a means for receiving the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol. The communications manager 1020 may be configured as or otherwise support a means for performing an automatic gain control procedure for the sidelink communications during an automatic gain control period that includes at least the first automatic gain control symbol and the second automatic gain control symbol.

Additionally or alternatively, the communications manager 1020 may support wireless communications at a first UE in accordance with examples as disclosed herein. For example, the communications manager 1020 may be configured as or otherwise support a means for receiving an indication of an SCS to be used for sidelink communications between the first UE and one or more second UEs. The communications manager 1020 may be configured as or otherwise support a means for receiving the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots. The communications manager 1020 may be configured as or otherwise support a means for performing an automatic gain control procedure for the sidelink communications during an automatic gain control period that includes the set of multiple automatic gain control symbols.

Additionally or alternatively, the communications manager 1020 may support wireless communications at a second UE in accordance with examples as disclosed herein. For example, the communications manager 1020 may be configured as or otherwise support a means for transmitting, to a first UE, an indication of an SCS to be used for sidelink communications between the first UE and the second UE. The communications manager 1020 may be configured as or otherwise support a means for transmitting, to the first UE, the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol.

Additionally or alternatively, the communications manager 1020 may support wireless communications at a second UE in accordance with examples as disclosed herein. For example, the communications manager 1020 may be configured as or otherwise support a means for transmitting, to a first UE an indication of an SCS to be used for sidelink communications between the first UE and the second UE. The communications manager 1020 may be configured as or otherwise support a means for transmitting, to the first UE, the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots.

By including or configuring the communications manager 1020 in accordance with examples as described herein, the device 1005 may support techniques for reduced latency, more efficient utilization of communication resources, and improved utilization of processing capability via enabling a UE to perform an AGC process at high SCS.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of slot structure for automatic gain control for high SCS as described herein, or the processor 1040 and the memory 1030 may be otherwise configured to perform or support such operations.

Figure 11:
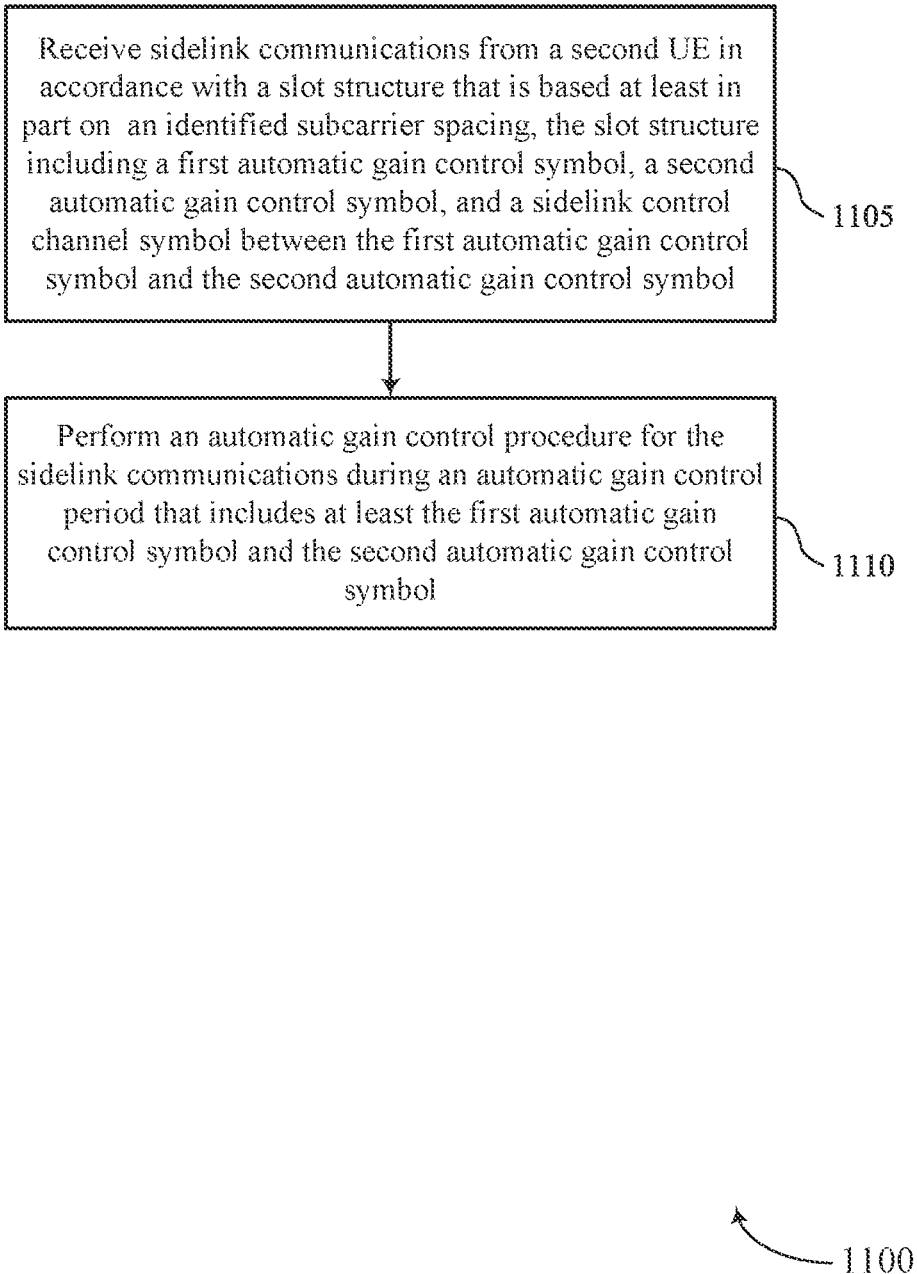
FIGS. 11 through 16 show flowcharts illustrating methods that support slot structure for automatic gain control for high subcarrier spacing in accordance with one or more aspects of the present disclosure.

FIG. 11 shows a flowchart illustrating a method 1100 that supports slot structure for automatic gain control for high SCS in accordance with one or more aspects of the present disclosure. The operations of the method 1100 may be implemented by a UE or its components as described herein. For example, the operations of the method 1100 may be performed by a UE 115 as described with reference to FIGS. 1 through 10. In some examples, a UE may execute a set of instructions to control the functional elements of the IE to perform the described functions. Additionally or alternatively, the UE may perform aspects of the described functions using special-purpose hardware.

At 1105, the method may include receiving an indication of an SCS to be used for sidelink communications between the first UE and one or more second UEs. The operations of 1105 may be performed in accordance with examples as disclosed herein. In some examples, aspects of the operations of 1105 may be performed by an SCS manager 925 as described with reference to FIG. 9.

At 1110, the method may include receiving the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol. The operations of 1110 may be performed in accordance with examples as disclosed herein. In some examples, aspects of the operations of 1110 may be performed by a slot structure manager 930 as described with reference to FIG. 9.

At 1115, the method may include performing an automatic gain control procedure for the sidelink communications during an automatic gain control period that includes at least the first automatic gain control symbol and the second automatic gain control symbol. The operations of 1115 may be performed in accordance with examples as disclosed herein. In some examples, aspects of the operations of 1115 may be performed by an AGC manager 935 as described with reference to FIG. 9.

Figure 12:
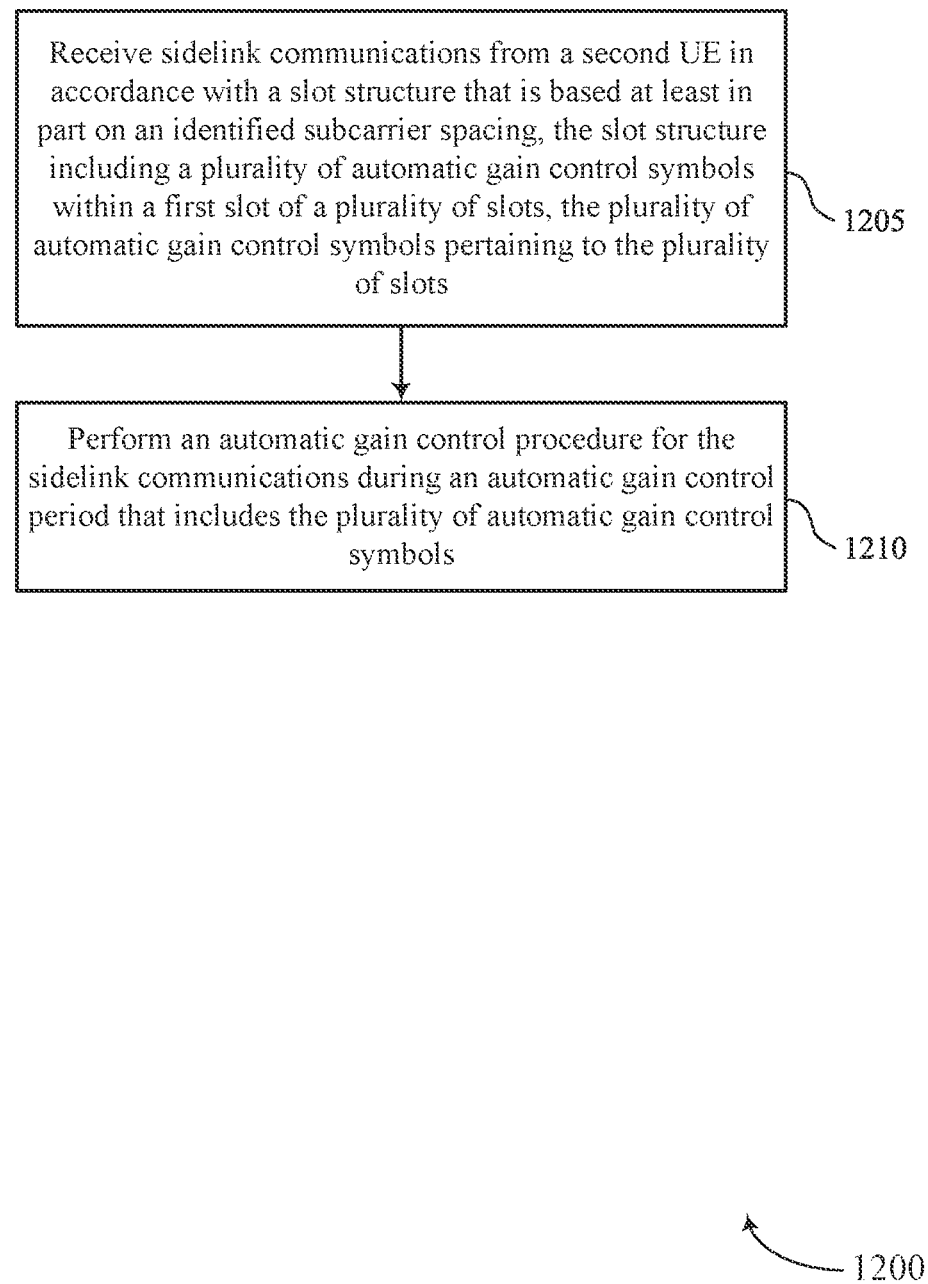

FIG. 12 shows a flowchart illustrating a method 1200 that supports slot structure for automatic gain control for high SCS in accordance with one or more aspects of the present disclosure. The operations of the method 1200 may be implemented by a UE or its components as described herein. For example, the operations of the method 1200 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1205, the method may include receiving an indication of an SCS to be used for sidelink communications between the first UE and one or more second UEs. The operations of 1205 may be performed in accordance with examples as disclosed herein. In some examples, aspects of the operations of 1205 may be performed by an SCS manager 925 as described with reference to FIG. 9.

At 1210, the method may include receiving the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots. The operations of 1210 may be performed in accordance with examples as disclosed herein. In some examples, aspects of the operations of 1210 may be performed by a slot structure manager 930 as described with reference to FIG. 9.

At 1215, the method may include performing an automatic gain control procedure for the sidelink communications during an automatic gain control period that includes the set of multiple automatic gain control symbols. The operations of 1215 may be performed in accordance with examples as disclosed herein. In some examples, aspects of the operations of 1215 may be performed by an AGC manager 935 as described with reference to FIG. 9.

Figure 13:
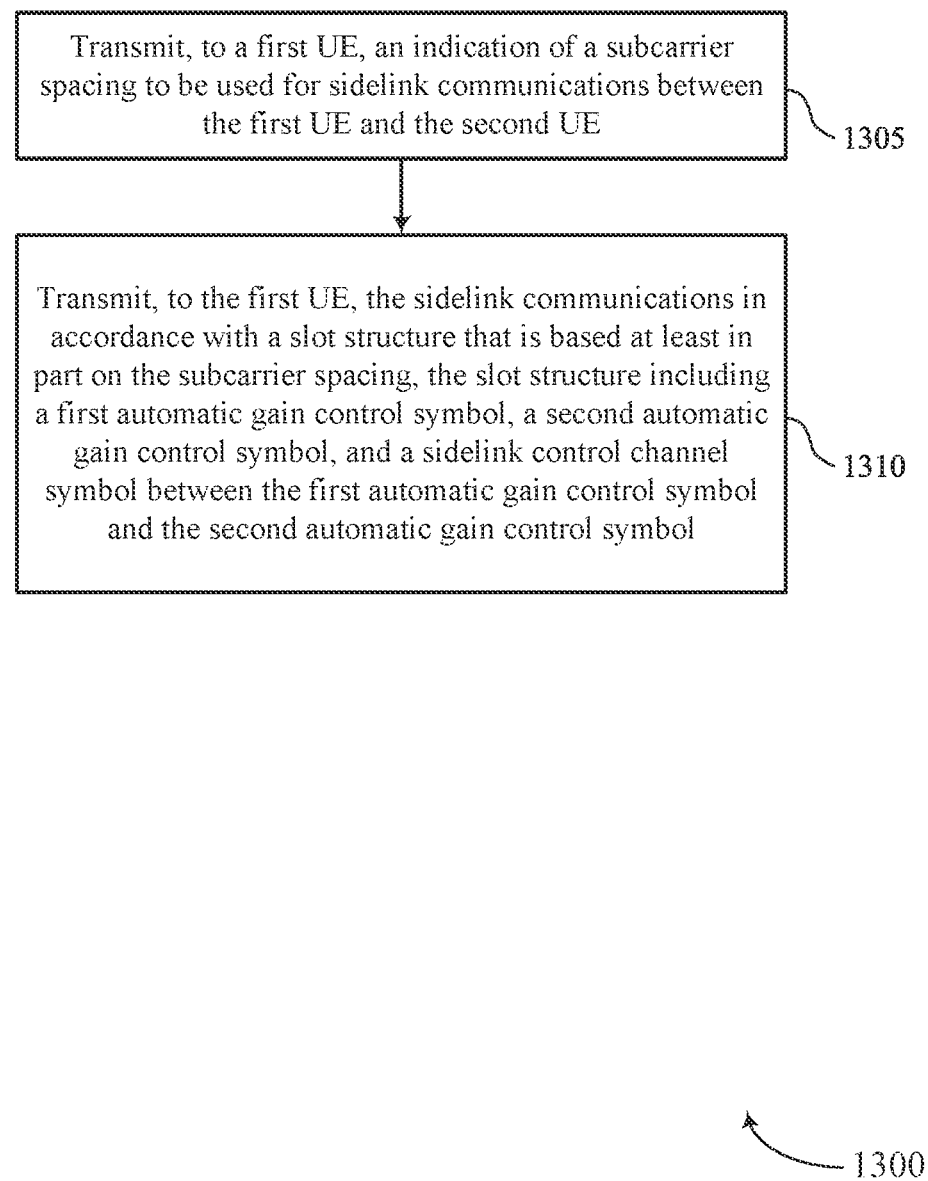

FIG. 13 shows a flowchart illustrating a method 1300 that supports slot structure for automatic gain control for high SCS in accordance with one or more aspects of the present disclosure. The operations of the method 1300 may be implemented by a UE or its components as described herein. For example, the operations of the method 1300 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1305, the method may include transmitting, to a first UE, an indication of an SCS to be used for sidelink communications between the first UE and the second UE, The operations of 1305 may be performed in accordance with examples as disclosed herein. In some examples, aspects of the operations of 1305 may be performed by an SCS manager 925 as described with reference to FIG. 9.

At 1310, the method may include transmitting, to the first UE, the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol. The operations of 1310 may be performed in accordance with examples as disclosed herein. In some examples, aspects of the operations of 1310 may be performed by a slot structure manager 930 as described with reference to FIG. 9.

Figure 14:
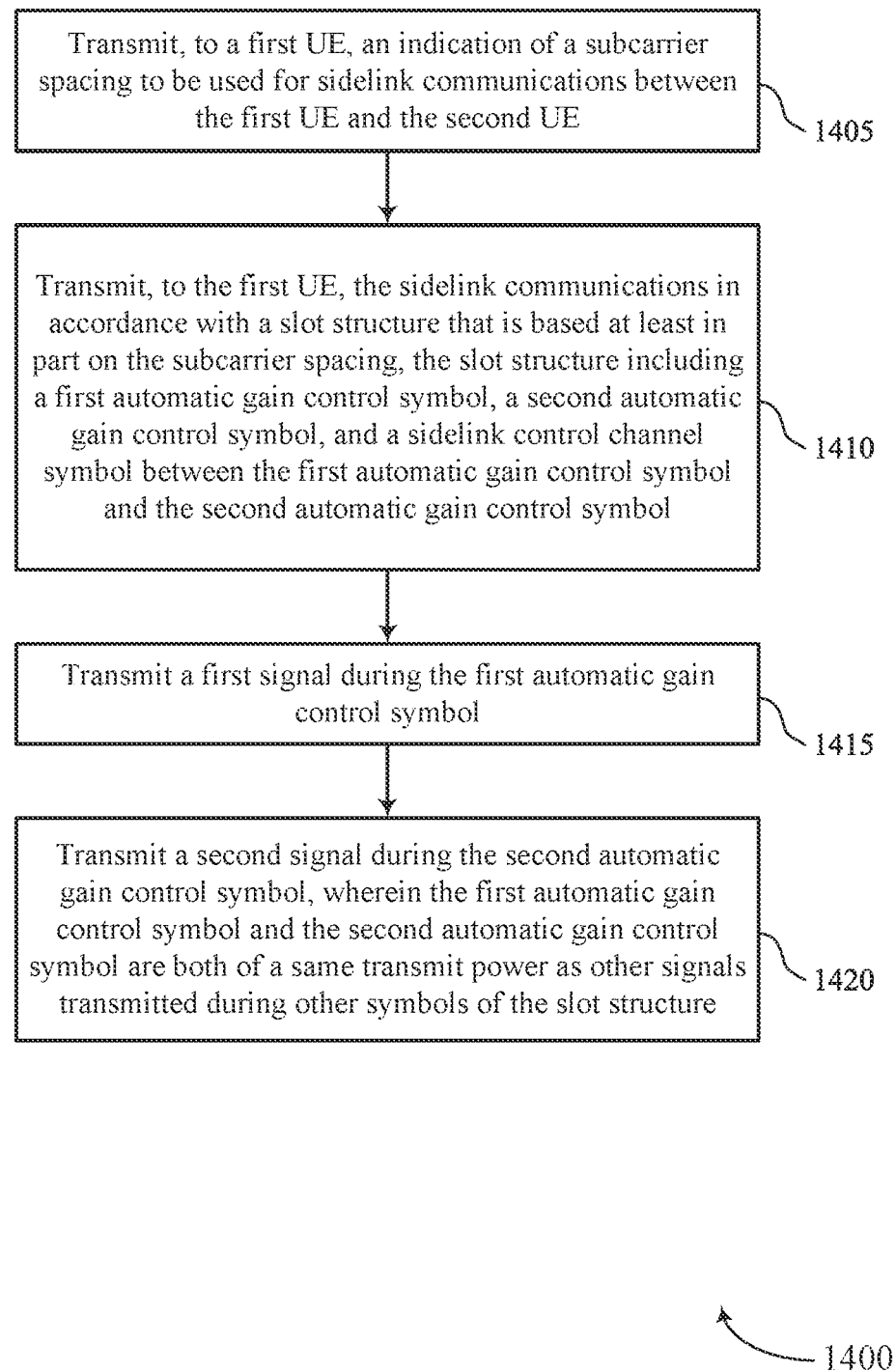

FIG. 14 shows a flowchart illustrating a method 1400 that supports slot structure for automatic gain control for high SCS in accordance with one or more aspects of the present disclosure. The operations of the method 1400 may be implemented by a UE or its components as described herein. For example, the operations of the method 1400 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1405, the method may include transmitting, to a first UE, an indication of an SCS to be used for sidelink communications between the first UE and the second UE. The operations of 1405 may be performed in accordance with examples as disclosed herein. In some examples, aspects of the operations of 1405 may be performed by an SCS manager 925 as described with reference to FIG. 9.

At 1410, the method may include transmitting, to the first UE, the sidelink communications in accordance with a slot structure that is based on the SCS, the slot structure including a first automatic gain control symbol, a second automatic gain control symbol, and a sidelink control channel symbol between the first automatic gain control symbol and the second automatic gain control symbol. The operations of 1410 may be performed in accordance with examples as disclosed herein. In some examples, aspects of the operations of 1410 may be performed by a slot structure manager 930 as described with reference to FIG. 9.

At 1415, the method may include transmitting a first signal during the first automatic gain control symbol. The operations of 1415 may be performed in accordance with examples as disclosed herein. In some examples, aspects of the operations of 1415 may be performed by a sidelink transmission manager 965 as described with reference to FIG. 9.

At 1420, the method may include transmitting a second signal during the second automatic gain control symbol, where the first automatic gain control symbol and the second automatic gain control symbol are both of a same transmit power as other signals received during other symbols of the slot structure. The operations of 1420 may be performed in accordance with examples as disclosed herein. In some examples, aspects of the operations of 1420 may be performed by a sidelink transmission manager 965 as described with reference to FIG. 9.

Figure 15:
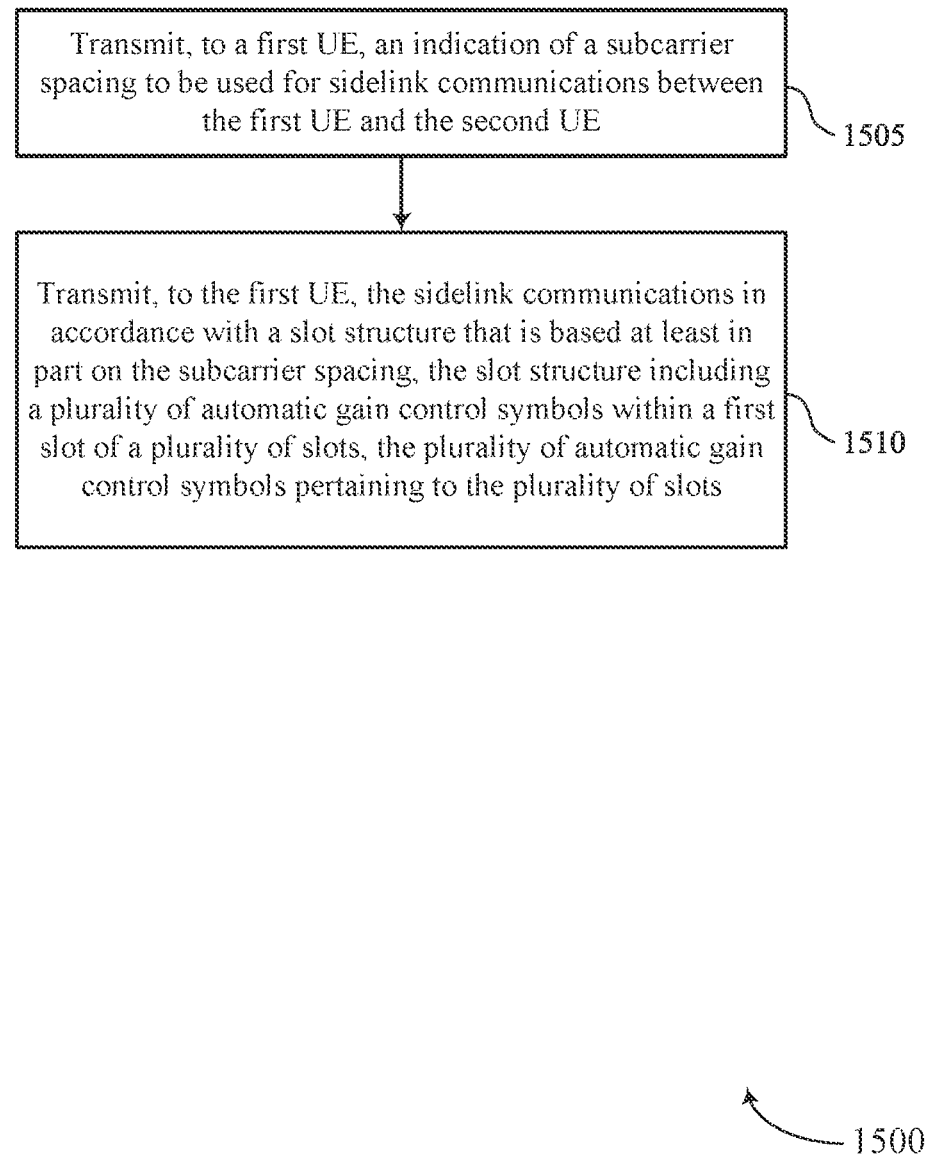

FIG. 15 shows a flowchart illustrating a method 1500 that supports slot structure for automatic gain control for high SCS in accordance with one or more aspects of the present disclosure. The operations of the method 1500 may be implemented by a UE or its components as described herein. For example, the operations of the method 1500 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1505, the method may include transmitting, to a first UE, an indication of an SCS to be used for sidelink communications between the first UE and the second UE. The operations of 1505 may be performed in accordance with examples as disclosed herein. In some examples, aspects of the operations of 1505 may be performed by an SCS manager 925 as described with reference to FIG. 9.

At 1510, the method may include transmitting, to the first UE, the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots. The operations of 1510 may be performed in accordance with examples as disclosed herein. In some examples, aspects of the operations of 1510 may be performed by a slot structure manager 930 as described with reference to FIG. 9.

Figure 16:
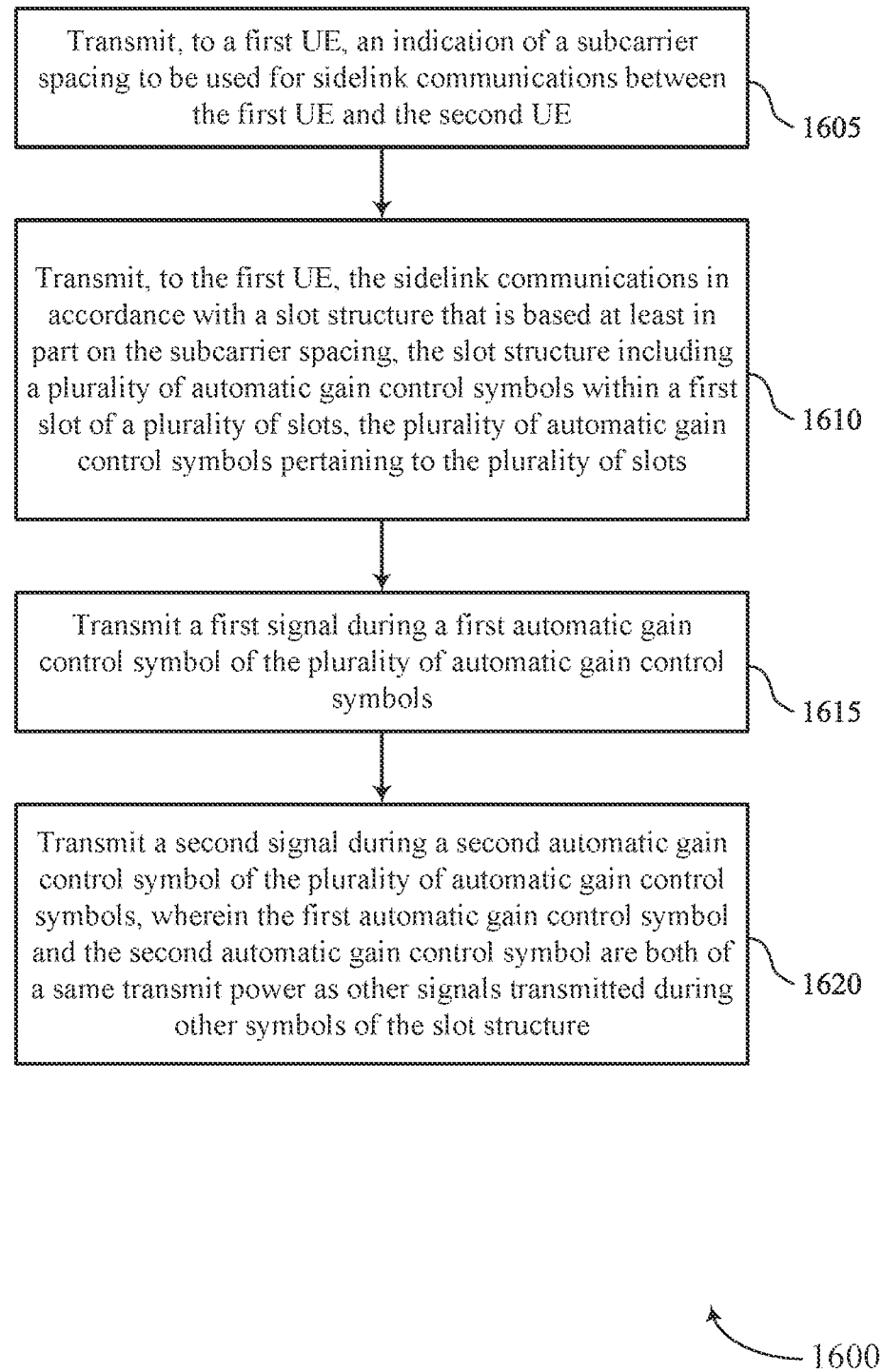

FIG. 16 shows a flowchart illustrating a method 1600 that supports slot structure for automatic gain control for high SCS in accordance with one or more aspects of the present disclosure. The operations of the method 1600 may be implemented by a UE or its components as described herein. For example, the operations of the method 1600 may be performed by a UE 115 as described with reference to FIGS. 1 through 10. In some examples, a UE may execute a set of instructions to control the functional elements of the UE to perform the described functions. Additionally or alternatively, the UE may perform aspects of the described functions using special-purpose hardware.

At 1605, the method may include transmitting, to a first UE, an indication of an SCS to be used for sidelink communications between the first UE and the second UE. The operations of 1605 may be performed in accordance with examples as disclosed herein. In some examples, aspects of the operations of 1605 may be performed by an SCS manager 925 as described with reference to FIG. 9.

At 1610, the method may include transmitting, to the first UE, the sidelink communications in accordance with a slot structure that is based on the SCS, the slot structure including a set of multiple automatic gain control symbols within a first slot of a set of multiple slots, the set of multiple automatic gain control symbols pertaining to the set of multiple slots. The operations of 1610 may be performed in accordance with examples as disclosed herein. In some examples, aspects of the operations of 1610 may be performed by a slot structure manager 930 as described with reference to FIG. 9.

At 1615, the method may include transmitting a first signal during a first automatic gain control symbol of the set of multiple automatic gain control symbols. The operations of 1615 may be performed in accordance with examples as disclosed herein. In some examples, aspects of the operations of 1615 may be performed by a sidelink transmission manager 965 as described with reference to FIG. 9.

At 1620, the method may include transmitting a second signal during a second automatic gain control symbol of the set of multiple automatic gain control symbols, where the first automatic gain control symbol and the second automatic gain control symbol are both of a same receive power as other signals received during other symbols of the slot structure. The operations of 1620 may be performed in accordance with examples as disclosed herein. In some examples, aspects of the operations of 1620 may be performed by a sidelink transmission manager 965 as described with reference to FIG. 9.

The following provides an overview of aspects of the present disclosure:

Aspect 1: A method for wireless communications at a first UE, comprising: receiving an indication of an SCS to be used for sidelink communications between the first UE and one or more second UEs; receiving the sidelink communications in accordance with a slot structure that is based at least in part on the SCS, the slot structure including a first automatic gain control symbol, a second automatic gain control symbol, and a sidelink control channel symbol between the first automatic gain control symbol and the second automatic gain control symbol: and performing an automatic gain control procedure for the sidelink communications during an automatic gain control period that includes at least the first automatic gain control symbol and the second automatic gain control symbol.

Aspect 2: The method of aspect 1, further comprising: applying, based at least in part on the automatic gain control procedure, an automatic gain control to the sidelink communications that occur over a plurality of slots.

Aspect 3: The method of any of aspects 1 through 2, the receiving the sidelink communications in accordance with the slot structure comprising: receiving a first instance of a first signal during a temporally first symbol of the slot structure; and receiving a second instance of the first signal during a temporally second symbol of the slot structure, wherein the temporally first symbol of the slot structure is the first automatic gain control symbol, and wherein the temporally second symbol of the slot structure is the sidelink control channel symbol.

Aspect 4: The method of aspect 3, the receiving the sidelink communications in accordance with the slot structure further comprising: receiving a first instance of a second signal during a temporally third symbol of the slot structure; and receiving a second instance of the second signal during a temporally fourth symbol of the slot structure, wherein the temporally third symbol of the slot structure is the second automatic gain control symbol.

Aspect 5: The method of any of aspects 1 through 4, the receiving the sidelink communications in accordance with the slot structure comprising: receiving a first instance of a first signal during the first automatic gain control symbol; receiving a second instance of the first signal during the slot structure: receiving a first instance of a second signal during the second automatic gain control symbol; and receiving a second instance of the second signal during the slot structure.

Aspect 6: The method of any of aspects 1 through 5, the receiving the sidelink communications in accordance with the slot structure comprising: receiving a first signal during the first automatic gain control symbol; and receiving a second signal during the second automatic gain control symbol, wherein the first automatic gain control symbol and the second automatic gain control symbol are both of a same receive power as other signals received during other symbols of the slot structure.

Aspect 7: The method of any of aspects 1 through 6, further comprising: receiving, in the sidelink control channel symbol, a sidelink control channel signal spanning a resource allocation of a sidelink shared channel associated with the sidelink control channel signal, the sidelink control channel symbol being a temporally second symbol of the slot structure.

Aspect 8: The method of aspect 7, further comprising: receiving, in a temporally fourth symbol of the slot structure and following the second automatic gain control symbol, a second portion of the sidelink control channel signal spanning a portion of the resource allocation.

Aspect 9: The method of aspect 8, further comprising: demodulating the sidelink control channel signal received in the temporally second symbol and the second portion of the sidelink control channel signal received in the temporally fourth symbol separately.

Aspect 10: The method of any of aspects 1 through 9, the performing the automatic gain control procedure comprising: measuring, at a first level of granularity, a first received signal strength during the first automatic gain control symbol; tuning a low noise amplifier of the first UE during the first automatic gain control symbol and based at least in part on the first received signal strength; measuring, at a second level of granularity that is more refined than the first level of granularity, a second received signal strength during the sidelink control channel symbol; and tuning the low noise amplifier of the first UE during the second automatic gain control symbol and based at least in part on the second received signal strength.

Aspect 11: The method of any of aspects 1 through 10, further comprising: selecting the slot structure from a plurality of available slot structures based at least in part on the SCS being above an SCS threshold.

Aspect 12: The method of aspect 11, wherein the SCS threshold is 30 kilohertz.

Aspect 13: A method for wireless communications at a first UE, comprising: receiving an indication of an SCS to be used for sidelink communications between the first UE and one or more second UEs; receiving the sidelink communications in accordance with a slot structure that is based at least in part on the SCS, the slot structure including a plurality of automatic gain control symbols within a first slot of a plurality of slots, the plurality of automatic gain control symbols pertaining to the plurality of slots; and performing an automatic gain control procedure for the sidelink communications during an automatic gain control period that includes the plurality of automatic gain control symbols.

Aspect 14: The method of aspect 13, wherein the slot structure further comprises a sidelink control channel symbol within the first slot of the plurality of slots, the sidelink control channel symbol pertaining to the plurality of slots.

Aspect 15: The method of aspect 14, the receiving the sidelink communications in accordance with the slot structure comprising: receiving a sidelink control channel message during the sidelink control channel symbol which is between instances of the automatic gain control symbols of the plurality of automatic gain control symbols in the first slot.

Aspect 16: The method of any of aspects 14 through 15, the receiving the sidelink communications in accordance with the slot structure comprising: receiving a sidelink control channel message during the sidelink control channel symbol which is after the plurality of automatic gain control symbols in the first slot.

Aspect 17: The method of any of aspects 14 through 16, the receiving the sidelink communications in accordance with the slot structure comprising: receiving the sidelink communications, at least in part, during a second slot of the plurality of slots, the second slot comprising a plurality of symbols, each symbol of the plurality of symbols comprising a data symbol.

Aspect 18: The method of any of aspects 13 through 17, the receiving the sidelink communications in accordance with the slot structure comprising: receiving a first signal during a first automatic gain control symbol of the plurality of automatic gain control symbols; and receiving a second signal during a second automatic gain control symbol of the plurality of automatic gain control symbols, wherein the first automatic gain control symbol and the second automatic gain control symbol are both of a same receive power as other signals received during other symbols of the slot structure.

Aspect 19: The method of any of aspects 13 through 18, further comprising: applying a result of the automatic gain control procedure to the plurality of slots, wherein a number of slots of the plurality of slots is based at least in part on a resource pool associated with the sidelink communications.

Aspect 20: The method of any of aspects 13 through 19, the receiving the sidelink communications in accordance with the slot structure comprising: receiving the sidelink communications, at least in part, during a temporally last slot of the plurality of slots, wherein the temporally last slot includes a guard symbol as a temporally last symbol of the temporally last slot, a respective temporally last symbol of other slots of the plurality of slots comprising a data symbol.

Aspect 21: The method of any of aspects 13 through 20, the performing the automatic gain control comprising: measuring, at a first level of granularity, a first received signal strength during a first automatic gain control symbol of the plurality of automatic gain control symbols; tuning a low noise amplifier of the first UE during the first automatic gain control symbol and based at least in part on the first received signal strength; measuring, at a second level of granularity that is more refined than the first level of granularity, a second received signal strength during a second automatic gain control symbol of the plurality of automatic gain control symbols; and tuning the low noise amplifier of the first UE during a third automatic gain control symbol of the plurality of automatic gain control symbols and based at least in part on the second received signal strength.

Aspect 22: The method of any of aspects 13 through 21, further comprising: selecting the slot structure from a plurality of available slot structures based at least in part on the SCS being above an SCS threshold.

Aspect 23: The method of aspect 22, wherein the SCS threshold comprises 30 kilohertz.

Aspect 24: A method for wireless communications at a second UE, comprising: transmitting, to a first UE, an indication of an SCS to be used for sidelink communications between the first UE and the second UE; and transmitting, to the first UE, the sidelink communications in accordance with a slot structure that is based at least in part on the SCS, the slot structure including a first automatic gain control symbol, a second automatic gain control symbol, and a sidelink control channel symbol between the first automatic gain control symbol and the second automatic gain control symbol.

Aspect 25: The method of aspect 24, the transmitting the sidelink communications in accordance with the slot structure comprising: transmitting a first instance of a first signal during a temporally first symbol of the slot structure: and transmitting a second instance of the first signal during a temporally second symbol of the slot structure, wherein the temporally first symbol of the slot structure is the first automatic gain control symbol, and wherein the temporally second symbol of the slot structure is the sidelink control channel symbol.

Aspect 26: The method of aspect 25, the transmitting the sidelink communications in accordance with the slot structure further comprising: transmitting a first instance of a second signal during a temporally third symbol of the slot structure; and transmitting a second instance of the second signal during a temporally fourth symbol of the slot structure, wherein the temporally third symbol of the slot structure is the second automatic gain control symbol.

Aspect 27: The method of any of aspects 24 through 26, the transmitting the sidelink communications in accordance with the slot structure comprising: transmitting a first instance of a first signal during the first automatic gain control symbol; transmitting a second instance of the first signal during the slot structure; transmitting a first instance of a second signal during the second automatic gain control symbol: and transmitting a second instance of the second signal during the slot structure.

Aspect 28: The method of any of aspects 24 through 27, the transmitting the sidelink communications in accordance with the slot structure comprising: transmitting a first signal during the first automatic gain control symbol: and transmitting a second signal during the second automatic gain control symbol, wherein the first automatic gain control symbol and the second automatic gain control symbol are both of a same transmit power as other signals received during other symbols of the slot structure.

Aspect 29: The method of any of aspects 24 through 28, further comprising: transmitting, in the sidelink control channel symbol, a sidelink control channel signal spanning a resource allocation of a sidelink shared channel associated with the sidelink control channel signal, the sidelink control channel symbol being a temporally second symbol of the slot structure.

Aspect 30: The method of aspect 29, further comprising: transmitting, in a temporally fourth symbol of the slot structure and following the second automatic gain control symbol, a second portion of the sidelink control channel signal spanning a portion of the resource allocation.

Aspect 31: The method of any of aspects 24 through 30, further comprising: selecting the slot structure from a plurality of available slot structures based at least in part on the SCS being above an SCS threshold.

Aspect 32: The method of aspect 31, wherein the SCS threshold is 30 kilohertz.

Aspect 33: A method for wireless communications at a second UE, comprising: transmitting, to a first UE, an indication of an SCS to be used for sidelink communications between the first UE and the second UE; and transmitting, to the first UE, the sidelink communications in accordance with a slot structure that is based at least in part on the SCS, the slot structure including a plurality of automatic gain control symbols within a first slot of a plurality of slots, the plurality of automatic gain control symbols pertaining to the plurality of slots.

Aspect 34: The method of aspect 33, wherein the slot structure further comprises a sidelink control channel symbol within the first slot of the plurality of slots, the sidelink control channel symbol pertaining to the plurality of slots.

Aspect 35: The method of aspect 34, the transmitting the sidelink communications in accordance with the slot structure comprising: transmitting a sidelink control channel message during the sidelink control channel symbol which is between instances of the automatic gain control symbols of the plurality of automatic gain control symbols in the first slot.

Aspect 36: The method of any of aspects 34 through 35, the transmitting the sidelink communications in accordance with the slot structure comprising: transmitting a sidelink control channel message during the sidelink control channel symbol which is after the plurality of automatic gain control symbols in the first slot.

Aspect 37: The method of any of aspects 34 through 36, the transmitting the sidelink communications in accordance with the slot structure comprising: transmitting the sidelink communications, at least in part, during a second slot of the plurality of slots, the second slot comprising a plurality of symbols, each symbol of the plurality of symbols comprising a data symbol.

Aspect 38: The method of any of aspects 33 through 37, the transmitting the sidelink communications in accordance with the slot structure comprising: transmitting a first signal during a first automatic gain control symbol of the plurality of automatic gain control symbols; and transmitting a second signal during a second automatic gain control symbol of the plurality of automatic gain control symbols, wherein the first automatic gain control symbol and the second automatic gain control symbol are both of a same receive power as other signals received during other symbols of the slot structure.

Aspect 39: The method of any of aspects 33 through 38, the transmitting the sidelink communications in accordance with the slot structure comprising: transmitting the sidelink communications, at least in part, during a temporally last slot of the plurality of slots, wherein the temporally last slot includes a guard symbol as a temporally last symbol of the temporally last slot, a respective temporally last symbol of other slots of the plurality of slots comprising a data symbol.

Aspect 40: The method of any of aspects 33 through 39, further comprising: selecting the slot structure from a plurality of available slot structures based at least in part on the SCS being above an SCS threshold.

Aspect 41: The method of aspect 40, wherein the SCS threshold comprises 30 kilohertz.

Aspect 42: An apparatus for wireless communications at a first UE, comprising a processor; and memory coupled with the processor; the processor configured to perform a method of any of aspects 1 through 12.

Aspect 43: An apparatus for wireless communications at a first UE, comprising at least one means for performing a method of any of aspects 1 through 12.

Aspect 44: A non-transitory computer-readable medium storing code for wireless communications at a first UE, the code comprising instructions executable by a processor to perform a method of any of aspects 1 through 12.

Aspect 45: An apparatus for wireless communications at a first UE, comprising a processor; and memory coupled with the processor; the processor configured to perform a method of any of aspects 13 through 23.

Aspect 46: An apparatus for wireless communications at a first UE, comprising at least one means for performing a method of any of aspects 13 through 23.

Aspect 47: A non-transitory computer-readable medium storing code for wireless communications at a first UE, the code comprising instructions executable by a processor to perform a method of any of aspects 13 through 23.

Aspect 48: An apparatus for wireless communications at a second UE, comprising a processor; and memory coupled with the processor; the processor configured to perform a method of any of aspects 24 through 32.

Aspect 49: An apparatus for wireless communications at a second UE, comprising at least one means for performing a method of any of aspects 24 through 32.

Aspect 50: A non-transitory computer-readable medium storing code for wireless communications at a second UE, the code comprising instructions executable by a processor to perform a method of any of aspects 24 through 32.

Aspect 51: An apparatus for wireless communications at a second UE, comprising a processor; and memory coupled with the processor; the processor configured to perform a method of any of aspects 33 through 41.

Aspect 52: An apparatus for wireless communications at a second UE, comprising at least one means for performing a method of any of aspects 33 through 41.

Aspect 53: A non-transitory computer-readable medium storing code for wireless communications at a second UE, the code comprising instructions executable by a processor to perform a method of any of aspects 33 through 41.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LT E-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wire less technologies such as infrared, radio, and microwave, then the coaxial cable, fiber optic cable, twisted pair, DSL, or wire less technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A. B, or C means A or B or C or AB or AC or BC or ABC (i.e., A and B and C. Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

As used herein, including; in the claims, the term "set" refers to a group of one or more.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples" The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
   one or more memories; and
   one or more processors coupled with the one or more memories and configured to cause the first UE to:
   receive an indication of a subcarrier spacing to be used for sidelink communications between the first UE and one or more second UEs;
   receive the sidelink communications in accordance with a slot structure that is based at least in part on the subcarrier spacing, the slot structure including a first automatic gain control symbol, a second automatic gain control symbol, and a sidelink control channel symbol between the first automatic gain control symbol and the second automatic gain control symbol; and
   perform an automatic gain control procedure for the sidelink communications during an automatic gain control period that includes at least the first automatic gain control symbol and the second automatic gain control symbol.

2. The apparatus of claim 1, wherein the one or more processors are configured to cause the first UE to:
   apply, based at least in part on the automatic gain control procedure, an automatic gain control to the sidelink communications that occur over a plurality of slots.

3. The apparatus of claim 1, wherein, to receive the sidelink communications in accordance with the slot structure, the one or more processors are configured to cause the first UE to:
   receive a first instance of a first signal during a temporally first symbol of the slot structure; and
   receive a second instance of the first signal during a temporally second symbol of the slot structure, wherein the temporally first symbol of the slot structure is the first automatic gain control symbol, and wherein the temporally second symbol of the slot structure is the sidelink control channel symbol.

4. The apparatus of claim 3, wherein, to receive the sidelink communications in accordance with the slot structure, the one or more processors are configured to cause the first UE to:
   receive a first instance of a second signal during a temporally third symbol of the slot structure; and
   receive a second instance of the second signal during a temporally fourth symbol of the slot structure, wherein the temporally third symbol of the slot structure is the second automatic gain control symbol.

5. The apparatus of claim 1, further comprising:
   an antenna operable to:
   receive a first instance of a first signal during the first automatic gain control symbol;
   receive a second instance of the first signal during the slot structure;
   receive a first instance of a second signal during the second automatic gain control symbol; and
   receive a second instance of the second signal during the slot structure.

6. The apparatus of claim 1, wherein, to receive the sidelink communications in accordance with the slot structure, the one or more processors are configured to cause the first UE to:
   receive a first signal during the first automatic gain control symbol; and
   receive a second signal during the second automatic gain control symbol, wherein the first automatic gain control symbol and the second automatic gain control symbol are both of a same receive power as other signals received during other symbols of the slot structure.

7. The apparatus of claim 1, wherein the one or more processors are configured to cause the first UE to:
   receive, in the sidelink control channel symbol, a sidelink control channel signal that spans a resource allocation of a sidelink shared channel associated with the sidelink control channel signal, wherein the sidelink control channel symbol is a temporally second symbol of the slot structure.

8. The apparatus of claim 7, wherein the one or more processors are configured to cause the first UE to:
   receive, in a temporally fourth symbol of the slot structure and following the second automatic gain control symbol, a second portion of the sidelink control channel signal spanning a portion of the resource allocation.

9. The apparatus of claim 8, wherein the one or more processors are configured to cause the first UE to:
   demodulate the sidelink control channel signal received in the temporally second symbol and the second portion of the sidelink control channel signal received in the temporally fourth symbol separately.

10. The apparatus of claim 8, wherein, to perform the automatic gain control procedure, the one or more processors are configured to cause the first UE to:
    measure, at a first level of granularity, a first received signal strength during the first automatic gain control symbol;
    tune a low noise amplifier of the first UE during the first automatic gain control symbol and based at least in part on the first received signal strength;
    measure, at a second level of granularity that is more refined than the first level of granularity, a second received signal strength during the sidelink control channel symbol; and
    tune the low noise amplifier of the first UE during the second automatic gain control symbol and based at least in part on the second received signal strength.

11. An apparatus for wireless communications at a first user equipment (UE), comprising:
    one or more memories; and
    one or more processors coupled with the one or more memories and configured to cause the first UE to:
    receive an indication of a subcarrier spacing to be used for sidelink communications between the first UE and one or more second UEs;

receive the sidelink communications in accordance with a slot structure that is based at least in part on the subcarrier spacing, the slot structure including a plurality of automatic gain control symbols within a first slot of a plurality of slots, wherein the plurality of automatic gain control symbols pertains to the plurality of slots; and perform an automatic gain control procedure for the sidelink communications during an automatic gain control period that includes the plurality of automatic gain control symbols.

12. The apparatus of claim 11, wherein the slot structure further comprises a sidelink control channel symbol within the first slot of the plurality of slots, and wherein the sidelink control channel symbol pertains to the plurality of slots.

13. The apparatus of claim 12, wherein, to receive the sidelink communications in accordance with the slot structure, the one or more processors are configured to cause the first UE to:

receive a sidelink control channel message during the sidelink control channel symbol which is between instances of automatic gain control symbols of the plurality of automatic gain control symbols in the first slot.

14. The apparatus of claim 12, wherein, to receive the sidelink communications in accordance with the slot structure, the one or more processors are configured to cause the first UE to:

receive a sidelink control channel message during the sidelink control channel symbol which is after the plurality of automatic gain control symbols in the first slot.

15. The apparatus of claim 11, wherein, to receive the sidelink communications in accordance with the slot structure, the one or more processors are configured to cause the first UE to:

receive the sidelink communications, at least in part, during a second slot of the plurality of slots, the second slot comprising a plurality of symbols, each symbol of the plurality of symbols comprising a data symbol.

16. The apparatus of claim 11, wherein, to receive the sidelink communications in accordance with the slot structure, the one or more processors are configured to cause the first UE to:

receive a first signal during a first automatic gain control symbol of the plurality of automatic gain control symbols; and receive a second signal during a second automatic gain control symbol of the plurality of automatic gain control symbols, wherein the first automatic gain control symbol and the second automatic gain control symbol are both of a same receive power as other signals received during other symbols of the slot structure.

17. The apparatus of claim 11, wherein, to receive the sidelink communications in accordance with the slot structure, the one or more processors are configured to cause the first UE to:

receive the sidelink communications, at least in part, during a temporally last slot of the plurality of slots, wherein the temporally last slot includes a guard symbol as a temporally last symbol of the temporally last slot, a respective temporally last symbol of other slots of the plurality of slots comprising a data symbol.

18. The apparatus of claim 11, wherein, to perform the automatic gain control procedure, the one or more processors are configured to cause the first UE to:

measure, at a first level of granularity, a first received signal strength during a first automatic gain control symbol of the plurality of automatic gain control symbols;

tune a low noise amplifier of the first UE during the first automatic gain control symbol and based at least in part on the first received signal strength;

measure, at a second level of granularity that is more refined than the first level of granularity, a second received signal strength during a second automatic gain control symbol of the plurality of automatic gain control symbols; and tune the low noise amplifier of the first UE during a third automatic gain control symbol of the plurality of automatic gain control symbols and based at least in part on the second received signal strength.

19. An apparatus for wireless communications at a second user equipment (UE), comprising:

one or more memories; and one or more processors coupled with the one or more memories and configured to cause the second UE to:

transmit, to a first UE, an indication of a subcarrier spacing to be used for sidelink communications between the first UE and the second UE; and transmit, to the first UE, the sidelink communications in accordance with a slot structure that is based at least in part on the subcarrier spacing, the slot structure including a first automatic gain control symbol, a second automatic gain control symbol, and a sidelink control channel symbol between the first automatic gain control symbol and the second automatic gain control symbol.

20. The apparatus of claim 19, wherein, to transmit the sidelink communications in accordance with the slot structure, the one or more processors are configured to cause the second UE to:

transmit a first instance of a first signal during a temporally first symbol of the slot structure; and transmit a second instance of the first signal during a temporally second symbol of the slot structure, wherein the temporally first symbol of the slot structure is the first automatic gain control symbol, and wherein the temporally second symbol of the slot structure is the sidelink control channel symbol.

21. The apparatus of claim 20, wherein, to transmit the sidelink communications in accordance with the slot structure, the one or more processors are configured to cause the second UE to:

transmit a first instance of a second signal during a temporally third symbol of the slot structure; and transmit a second instance of the second signal during a temporally fourth symbol of the slot structure, wherein the temporally third symbol of the slot structure is the second automatic gain control symbol.

22. The apparatus of claim 19, wherein, to transmit the sidelink communications in accordance with the slot structure, the one or more processors are configured to cause the second UE to:

transmit a first instance of a first signal during the first automatic gain control symbol;

transmit a second instance of the first signal during the slot structure;

transmit a first instance of a second signal during the second automatic gain control symbol; and transmit a second instance of the second signal during the slot structure.

23. The apparatus of claim 19, wherein, to transmit the sidelink communications in accordance with the slot structure, the one or more processors are configured to cause the second UE to:

transmit a first signal during the first automatic gain control symbol; and transmit a second signal during the second automatic gain control symbol, wherein the first automatic gain control symbol and the second automatic gain control symbol are both of a same transmit power as other signals received during other symbols of the slot structure.

24. The apparatus of claim 19, further comprising:

an antenna operable to transmit, in the sidelink control channel symbol, a sidelink control channel signal that spans a resource allocation of a sidelink shared channel associated with the sidelink control channel signal, wherein the sidelink control channel symbol is a temporally second symbol of the slot structure.

25. A method for wireless communications at a first user equipment (UE), comprising:

receiving an indication of a subcarrier spacing to be used for sidelink communications between the first UE and one or more second UEs;

receiving the sidelink communications in accordance with a slot structure that is based at least in part on the subcarrier spacing, the slot structure including a first automatic gain control symbol, a second automatic gain control symbol, and a sidelink control channel symbol between the first automatic gain control symbol and the second automatic gain control symbol; and performing an automatic gain control procedure for the sidelink communications during an automatic gain control period that includes at least the first automatic gain control symbol and the second automatic gain control symbol.

26. The method of claim 25, wherein receiving the sidelink communications in accordance with the slot structure comprises:

receiving a first instance of a first signal during a temporally first symbol of the slot structure; and receiving a second instance of the first signal during a temporally second symbol of the slot structure, wherein the temporally first symbol of the slot structure is the first automatic gain control symbol, and wherein the temporally second symbol of the slot structure is the sidelink control channel symbol.

27. The method of claim 26, wherein receiving the sidelink communications in accordance with the slot structure comprises:

receiving a first instance of a second signal during a temporally third symbol of the slot structure; and receiving a second instance of the second signal during a temporally fourth symbol of the slot structure, wherein the temporally third symbol of the slot structure is the second automatic gain control symbol.

28. The method of claim 25, further comprising:

receiving a first instance of a first signal during the first automatic gain control symbol;

receiving a second instance of the first signal during the slot structure;

receiving a first instance of a second signal during the second automatic gain control symbol; and receiving a second instance of the second signal during the slot structure.

29. A method for wireless communications at a first user equipment (UE), comprising:

receiving an indication of a subcarrier spacing to be used for sidelink communications between the first UE and one or more second UEs;

receiving the sidelink communications in accordance with a slot structure that is based at least in part on the subcarrier spacing, the slot structure including a plurality of automatic gain control symbols within a first slot of a plurality of slots, the plurality of automatic gain control symbols pertaining to the plurality of slots; and performing an automatic gain control procedure for the sidelink communications during an automatic gain control period that includes the plurality of automatic gain control symbols.

30. The method of claim 29, wherein the slot structure further comprises a sidelink control channel symbol within the first slot of the plurality of slots, the sidelink control channel symbol pertaining to the plurality of slots.

31. The method of claim 30, wherein receiving the sidelink communications in accordance with the slot structure comprises:

receiving a sidelink control channel message during the sidelink control channel symbol which is between instances of automatic gain control symbols of the plurality of automatic gain control symbols in the first slot.

32. The method of claim 30, wherein receiving the sidelink communications in accordance with the slot structure comprises:

receiving the sidelink communications, at least in part, during a second slot of the plurality of slots, the second slot comprising a plurality of symbols, each symbol of the plurality of symbols comprising a data symbol.

33. A method for wireless communications at a second user equipment (UE), comprising:

transmitting, to a first UE, an indication of a subcarrier spacing to be used for sidelink communications between the first UE and the second UE; and transmitting, to the first UE, the sidelink communications in accordance with a slot structure that is based at least in part on the subcarrier spacing, the slot structure including a first automatic gain control symbol, a second automatic gain control symbol, and a sidelink control channel symbol between the first automatic gain control symbol and the second automatic gain control symbol.

34. The method of claim 33, wherein transmitting the sidelink communications in accordance with the slot structure comprises:

transmitting a first instance of a first signal during a temporally first symbol of the slot structure; and transmitting a second instance of the first signal during a temporally second symbol of the slot structure, wherein the temporally first symbol of the slot structure is the first automatic gain control symbol, and wherein the temporally second symbol of the slot structure is the sidelink control channel symbol.

35. The method of claim 34, wherein transmitting the sidelink communications in accordance with the slot structure comprises:

transmitting a first instance of a second signal during a temporally third symbol of the slot structure; and transmitting a second instance of the second signal during a temporally fourth symbol of the slot structure, wherein the temporally third symbol of the slot structure is the second automatic gain control symbol.

\* \* \* \* \*